US012769934B2

(12) United States Patent
Dotan-Cohen et al.

(10) Patent No.: US 12,769,934 B2
(45) Date of Patent: Oct. 20, 2026

(54) # PERSONALIZED AND OPTIMALLY-SIZED BRIEFING MESSAGES

(71) Applicant: MICROSOFT TECHNOLOGY LICENSING, LLC, Redmond, WA (US)

(72) Inventors: Dikla Dotan-Cohen, Netanya (IL); Haim Somech, Ramat Gan (IL); Assaf Avihoo, Matan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 18/193,247

(22) Filed: Mar. 30, 2023

(65) Prior Publication Data

US 2024/0330578 A1 Oct. 3, 2024

(51) Int. Cl.
*G06F 40/186* (2020.01)
*G06F 40/103* (2020.01)
*G06F 40/279* (2020.01)
*G06F 40/40* (2020.01)
(Continued)

(52) U.S. Cl.
CPC .......... *G06F 40/186* (2020.01); *G06F 40/103* (2020.01); *G06F 40/279* (2020.01); *G06F 40/40* (2020.01); *G06V 10/40* (2022.01); *G06Q 10/10* (2013.01)

(58) Field of Classification Search
CPC .... G06F 40/186; G06F 40/103; G06F 40/279; G06F 40/40; G06V 10/40; G06Q 10/10
See application file for complete search history.

(56) References Cited

U.S. PATENT DOCUMENTS

| | | | | |
|---|---|---|---|---|
| 6,721,706 B1 * | 4/2004 | Strubbe | G10L 15/22 704/E15.04 |
| 7,809,599 B2 * | 10/2010 | Andrew | G06Q 10/109 713/153 |
| 8,032,597 B2 | 10/2011 | Khoo | |

(Continued)

OTHER PUBLICATIONS

"Daily Summary Email", Retrieved From: https://worksmarter.co.uk/help/user-accounts/daily-summary-email, Retrieved on: Jan. 10, 2023, 3 Pages.

(Continued)

*Primary Examiner* — Shahid K Khan
(74) *Attorney, Agent, or Firm* — Shook, Hardy & Bacon L.L.P.

(57) ABSTRACT

Technology is disclosed to programmatically generate a briefing message that is relevant, optimally-sized, and easy for a user to consume. The briefing message is generated with target briefing items organized based on a user-specific headline and user-specific body of the briefing message. The briefing message is generated based on a determination, from candidate briefing items and corresponding scores, of at least one target briefing item to be included in the body and the headline of a briefing message. In this manner, such technologies improve the user's experience and reduce computational resources and bandwidth associated with a larger volume of content being generated and communicated to a user for presentation, especially during times of high user computer traffic. The briefing content items are generated during times of the day with lower user activity and less computational resource consumption.

20 Claims, 11 Drawing Sheets

(51) Int. Cl.

| | |
|---|---|
| ***G06V 10/40*** | (2022.01) |
| *G06Q 10/10* | (2023.01) |

(56) References Cited

U.S. PATENT DOCUMENTS

| | | | | |
|---|---|---|---|---|
| 8,977,953 | B1 * | 3/2015 | Pierre | G06F 40/289 715/201 |
| 9,240,968 | B1 | 1/2016 | Johnson | |
| 9,596,207 | B1 * | 3/2017 | Lin | H04L 51/216 |
| 10,257,127 | B2 | 4/2019 | Dotan-Cohen et al. | |
| 10,516,637 | B2 | 12/2019 | Ghotbi et al. | |
| 10,977,258 | B1 * | 4/2021 | Liu | G06Q 10/00 |
| 11,120,372 | B2 * | 9/2021 | Gruber | H04W 4/02 |
| 2002/0122063 | A1 * | 9/2002 | Weinberg | G06F 3/0481 715/764 |
| 2012/0149342 | A1 * | 6/2012 | Cohen | H04L 51/224 455/412.2 |
| 2013/0237254 | A1 * | 9/2013 | Papakipos | G06Q 10/10 455/456.3 |
| 2014/0152541 | A1 * | 6/2014 | Murarka | G06F 3/0481 345/156 |
| 2014/0257852 | A1 * | 9/2014 | Walker | G06Q 10/10 705/3 |
| 2015/0019545 | A1 * | 1/2015 | Chedeau | G06F 16/24578 707/723 |
| 2015/0200899 | A1 | 7/2015 | Sanketi | |
| 2015/0234806 | A1 * | 8/2015 | Bhagwan | G06F 40/279 705/7.18 |
| 2015/0254213 | A1 * | 9/2015 | McGushion | G06F 3/0481 715/202 |
| 2015/0293972 | A1 * | 10/2015 | Lu | G06F 3/018 707/769 |
| 2016/0249319 | A1 * | 8/2016 | Dotan-Cohen | H04M 7/0033 |
| 2016/0262128 | A1 | 9/2016 | Hailpern et al. | |
| 2016/0358285 | A1 * | 12/2016 | McClure | G06Q 10/10 |
| 2017/0161372 | A1 | 6/2017 | FernÁndez et al. | |
| 2017/0171122 | A1 | 6/2017 | Friend et al. | |
| 2018/0287981 | A1 * | 10/2018 | Leiba | G06Q 10/10 |
| 2021/0312361 | A1 * | 10/2021 | Daley | G06N 20/00 |
| 2022/0083986 | A1 * | 3/2022 | Duffy | G06F 16/9535 |
| 2023/0052123 | A1 * | 2/2023 | Anaokar | H04L 12/1859 |
| 2023/0081372 | A1 * | 3/2023 | Hartman | G06F 16/345 705/2 |
| 2024/0126576 | A1 * | 4/2024 | Bent, III | G06F 40/166 |

OTHER PUBLICATIONS

Dehmer, et al., "Briefing Email Overview", Retrieved From: https://learn.microsoft.com/en-us/viva/insights/personal/briefing/be-overview, Feb. 18, 2023, 4 Pages.

Freed, et al., "RADAR: A Personal Assistant that Learns to Reduce Email Overload", In Proceedings of the Twenty-Third AAAI Conference on Artificial Intelligence, Jul. 13, 2008, 7 Pages.

* cited by examiner

PERSONALIZED AND OPTIMALLY-SIZED BRIEFING MESSAGES

BACKGROUND

As the number of tasks, meetings, electronic communications, documents, and other content an individual manages continues to increase, it becomes more difficult to stay on top of events, commitments, projects, current events, and so much more. Users today have lots of meetings, deadlines, work tasks, and so forth and increasingly rely on computer calendars, task reminder applications, project-planner applications, and the like, to keep on top of commitments and schedules. A briefing message can be a useful tool for helping users in this regard, but often they include too much or too little information, include information that is not relevant or helpful for the user's context, or include information that is not easily accessible or digestible. Accordingly, these notifications and reminder are easy for users to dismiss or ignore despite all the computational expenses going into creating these notification and reminders.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are directed toward technologies for automatically generating a summary communication (also referred to herein, in one example, as a "briefing message") that is relevant to a user, optimally-sized, and easy for the user to consume. Example summary communications or briefing messages include an email, a meeting summary, an event summary, an information feed, a newsletter, or any suitable briefing communication, and so forth. Accordingly, embodiments described in the present disclosure facilitate, among other things, determining a headline, such as a subject line for an email or title for a briefing message, a meeting summary, an event summary, an information feed, a newsletter, or any suitable briefing communication, and so forth. Further, certain embodiments disclosed herein additionally or alternatively facilitate determining content for briefing items included in a briefing message, which may include a briefing item heading and a briefing item description, in some instances.

In particular, embodiments described in the present disclosure improve the functionality of multimedia content generated or presented by computing applications accessible on user computing devices. This disclosure provides technologies to programmatically access (1) a user account that includes user-specific features and (2) user-content data for potential inclusion in a summary communication, such as a briefing message as described herein. This disclosure provides technologies to programmatically determine candidate briefing items corresponding to a discrete package of content from the user-content data. In one embodiment, the "briefing item" corresponds to packaged user-engagable data serving as a container to multiple computer experiences. In some embodiments, certain types of briefing items include a heading and a description, which are personalized to a user receiving the briefing message. For each candidate briefing item and based at least on user-specific features extracted from user-content data, this disclosure provides technologies to programmatically determine a corresponding score. This disclosure provides technologies to programmatically determine, from the candidate briefing items and based on the corresponding scores, at least one target briefing item to be indicated in a headline of the summary communication and in a body of the summary communication. This disclosure provides technologies to programmatically determine a format of the headline and a format of the body of the summary communication; and programmatically generate the summary communication to include the at least one target briefing item in the body and the subject line. Certain summary communications are generated based on the format of the headline and the format of the body of summary communication.

Such technologies improve the user experience in any of a number of computer applications and platforms. For example, user engagement and productivity can increase though the personalized or relevant engageable content contained in the summary communication. Further, these technologies reduce computational resources and bandwidth associated with a larger volume of content being generated and communicated to the user for presentation, especially during times of high user computer traffic. For example, a summary communication includes only a threshold quantity of briefing content items. Moreover, embodiments disclosed herein support on-demand download of these briefing content items. In one example, the briefing content items are generated during times of the day with lower user activity and less computational resource consumption.

BRIEF DESCRIPTION OF THE DRAWINGS

Aspects of the disclosure are described in detail below with reference to the attached drawing figures, wherein.

DETAILED DESCRIPTION

Figure 1:
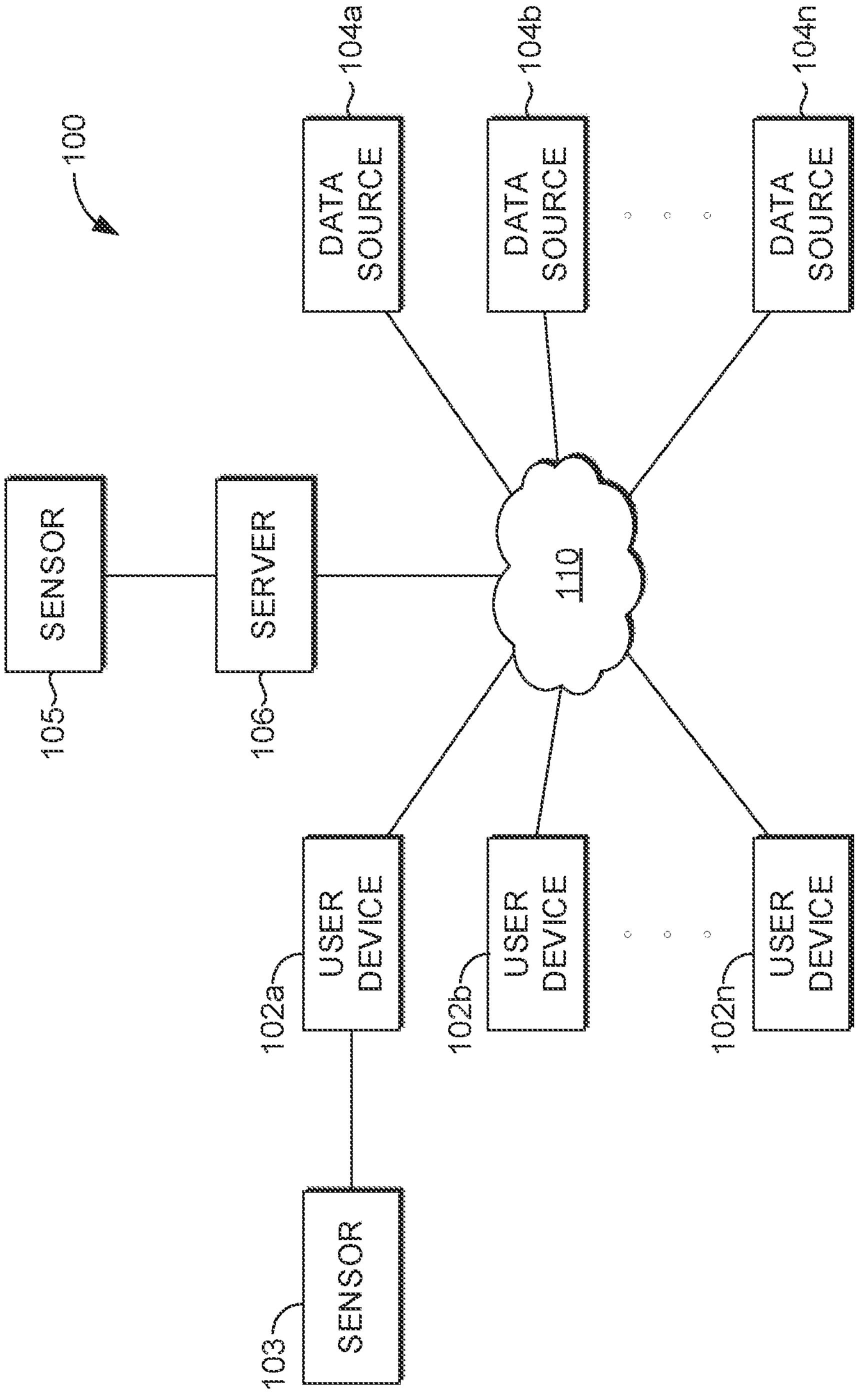
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The method(s) described herein may comprise a computing process performed using any combination of hardware, firmware, and/or software. For example, various functions are carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Certain communication and messaging service are useful tools to provide users with a summary briefing of their day or week, in one example referred to as a "briefing message." To improve upon this technical field, embodiments of the present disclosure relate to, among other things, technical improvements to electronic communication technology and enhanced computing services to automatically generate an improved briefing message (also referred to herein, in one example, as a "summary communication") that is relevant to a user (for example, personalized to the user), optimally-sized, and easy for the user to consume. Although certain embodiments are discussed in the context of a briefing message that includes a briefing email, it should be understood that a briefing message is not limited to a briefing email. For example, certain embodiments of the briefing message additionally or alternatively include an email, a meeting summary, an event summary, an information feed, a newsletter, or any suitable briefing communication, and so forth. Accordingly, certain embodiments disclosed herein facilitate determining a headline, such as a subject line for an email or a title for a meeting summary, an event summary, an information feed, a newsletter, or any suitable briefing communication, and so forth. Further, certain embodiments disclosed herein additionally or alternatively facilitate determining content for briefing items included in a briefing message, which may include a briefing item headline and a briefing item description, in some instances.

Certain existing briefing messages provide periodic messages to users with a preview of a user's schedule, action items, and commitments. However, often the briefing messages are not helpful because (1) not every item is included, (2) items that are included can be less relevant to the user than items that are omitted, and (3) items are merely listed without an option for acting on the items. Further still, rather than providing a helpful, quick-to-read snapshot of the user's most important items for the day, the existing briefing message must be opened and carefully read in order to manually extract the value from it. Accordingly, certain existing briefing messages provide more work for a user, instead of serving as a tool to improve efficiency.

To address these limitations, certain solutions provided herein include technologies to programmatically determine, from candidate briefing items and corresponding scores, at least one briefing item to be included in a body and indicated in a headline of a briefing message. In an example, a "candidate briefing item" refers to a discrete packaging of data assembled from user accounts and user-content data. For example, user accounts include user-content data from which user-specific features, such as those discussed herein, are extracted. Additionally, user-content data includes content sourced from a plurality of data sources, such as a productivity application, a calendar, information feed, status update, various web-based applications, and so forth. In one example, the data sources are segregated from one another. For example, the data sources correspond to different third party services. The candidate briefing item can include a discrete packaging of information that is at least somewhat relevant to the user and that is assembled for potential inclusion in the briefing message. In one example, the candidate briefing item is elevated to the status of a "target briefing item" based on a corresponding score being above a threshold or indicating a high ranking for the corresponding candidate briefing item. In one example, the "target briefing item" refers to a briefing item that is included in a briefing message.

In one example, a "briefing message" refers to a communication summary including information and tasks (for example, target briefing messages) to help a person be intentional with their day by providing organized and relevant information. The briefing message can include any number of briefing items, such as to-do items to prepare for meetings, tasks a user needs to follow up on, calculated focus time, determined meditation time, weekly outlook, catch-up session for the user to catch-up with his/her team, and settings, to name a few. The briefing items can be classified and grouped based on their classifications, as described herein. In an example, "meeting" refers to a gathering of one or more people that is at least partially hosted or supported by a computing application operating on a computing device, such as a meeting application, video conferencing application, or collaboration application, and for which a user interacts by way of a client computing device. In one example, the meeting includes a hybrid meeting where a portion of attendees are participating in-person, while another portion of attendees are participating via a client computing device as discussed above. For example, a meeting allows for meeting attendees to engage with each other or deliver content to other attendees at or near real-time. Computer application software supporting meetings generally also support additional features, such as a chat, a recording control, and so forth.

For each candidate briefing item and based at least on the user-specific features, embodiments of this disclosure provide technologies to programmatically determine a corresponding score. Example scores are calculated based on a freshness, relatedness to the user, uniqueness to the user, urgency to the user, and so forth, of the candidate briefing items as they relate to the user. In one example, the score is stored as metadata for a corresponding candidate briefing item.

Embodiments of this disclosure provide technologies to programmatically determine, from the candidate briefing items and based on the corresponding scores, at least one target briefing item to be indicated in a headline of the briefing message and included in a body of the briefing message. In one example, candidate briefing items are ranked based on their corresponding scores, such as individual scores or a weighted average of scores. Continuing this example, the top threshold number of candidate briefing items are elevated to target briefing items for inclusion in the briefing message. Alternatively or additionally, the candidate briefing items having a score above a threshold score value is included in the briefing message.

Embodiments of this disclosure provide technologies to programmatically determine a format of the headline and a format of the body of the briefing message. In one example, the format of the headline is selected from a plurality of candidate headline templates that have been predetermined, such as preapproved for use by an administrator. In one example, the format of the body of the briefing message is determined based on a relatedness of metadata of the target briefing items and templates of the briefing message. In one example, the format of the body of the briefing message is based on the type of device used by the user to access the briefing message, such as whether the user typically accesses the briefing message via a mobile device or a VR head set.

Embodiments of this disclosure provide technologies to programmatically generate the briefing message to include the at least one target briefing item in the body and the headline. Certain briefing messages are generated based on the format of the heading and the format of the body of the briefing message. In one example, the briefing message includes, for certain briefing items, (1) an image that is determined based on visual features associated with metadata contained in the briefing item and (2) a brief summary that is determined based on text features associated with metadata contained in the briefing item. In this manner, certain briefing messages include both an image and text to facilitate the user in consuming and quickly extrapolating information from the briefing message.

Such technologies improve the user experience in any of a number of computer applications and platforms. For example, user engagement and productivity can increase through the personalized and relevant engageable content contained in the summary communication. Further, these technologies reduce computational resources and bandwidth associated with a larger volume of content being generated and communicated to a user for presentation, especially during times of high user computer traffic. For example, a summary communication includes only a threshold quantity of briefing content items. Moreover, embodiments disclosed herein support on-demand download of these briefing content items. For example, the briefing content items are generated during times of the day with lower user activity and less computational resource consumption, such as in the morning before 6:00 am local time or in the evening after 9:00 pm local time.

Overview of Technical Problems, Technical Solutions, and Technological Improvements As previously described, a briefing message can be a useful tool for helping users stay on top of events, commitments, projects, current events, and so much more. However, often existing briefing messages include too much or too little information, include information that is not relevant or helpful for the user's context, or include information that is not easily accessible or digestible. Certain existing briefing messages are not helpful because (1) not every item is included and (2) items that are included are less relevant to the user than items that are omitted. Further still, rather than providing a helpful, quick-to-read snapshot of the user's most important items for the day, certain existing briefing message must be opened and carefully read in order to manually extract the value from it. Accordingly, certain existing briefing messages provide more work for a user, instead of serving as a tool to improve efficiency.

Accordingly, automated computing technology for automatically generating a briefing message that is relevant, optimally-sized, and easy for a user to consume can be beneficial for enabling improved computing applications and an improved user computing experience. For example, the personalized format of the briefing message headline disclosed herein can provide users with a high-priority briefing item in the headline, such as the subject line of a briefing message that is an email, without the user even having to open the briefing message document, thereby conserving bandwidth associated with a user opening a document and engaging with high-bandwidth content, such as a video contained in the briefing message. Further, embodiments of this disclosure address a need that arises from a large scale of operations created by software-based services that cannot be managed by humans. Moreover, the actions/operations described herein are not a mere use of a computer, but address results of a system that is a direct consequence of software used as a service offered in conjunction with user communication through services hosted across a variety of platforms and devices.

Further still, embodiments of this disclosure enable an improved user experience across a number of computer devices, applications, and platforms. Further still, embodiments described herein enable certain briefing items to be programmatically surfaced and presented based on user-specific features and user-content data sourced from many sources associated with the user. Even if a user wanted to manually pick and choose briefing items for inclusion in a briefing message, certain existing technology does not allow for a briefing message to be included with only a certain quantity of personalized briefing items, formatted based on a headline format and format of the briefing message body, as discussed herein. Additionally, even if a human attempted to perform the operations described herein, the human would not be able to personalize briefing messages for a large quantity of users having a wide variety of preferences and motivators, which would not be accessible to the human. Some embodiments described herein reduce or eliminate a need for certain databases, data storage, and computer controls for enabling manually performed steps by a person, to search, identify, assess, view content for inclusion in a briefing message, and configure (for example, by hard-coding) a format of the briefing message, thereby reducing the consumption of computing resources, such as those associated with manually and blindly toggling across sources (for example, websites or services hosted on servers) in search of a target briefing item for inclusion in a briefing message.

Additional Description of the Embodiments

Turning now to FIG. 1, a block diagram is provided showing an example operating environment 100 in which some embodiments of the present disclosure can be employed. It should be understood that this and other arrangements described herein are set forth only as examples. Other arrangements and elements (for example, machines, interfaces, functions, orders, and groupings of functions) can be used in addition to or instead of those shown, and some elements can be omitted altogether for the sake of clarity. Further, many of the elements described herein are functional entities that are implemented as discrete or distributed components or in conjunction with other components, and in any suitable combination and location. Various functions described herein as being performed by one or more entities are carried out by hardware, firmware, and/or software. For instance, some functions are carried out by a processor executing instructions stored in memory.

Among other components not shown, example operating environment 100 includes a number of user computing devices, such as user devices 102*a* and 102*b* through 102*n*; a number of data sources, such as data sources 104*a* and 104*b* through 104*n*; server 106; sensors 103 and 105; and network 110. It should be understood that operating environment 100 shown in FIG. 1 is an example of one suitable operating environment. Each of the components shown in FIG. 1 is implemented via any type of computing device, such as computing device 700 illustrated in FIG. 7, for example. In one embodiment, these components communicate with each other via network 110, which include, without limitation, one or more local area networks (LANs) and/or wide area networks (WANs). In one example, network 110 comprises the internet, intranet, and/or a cellular network, amongst any of a variety of possible public and/or private networks.

It should be understood that any number of user devices, servers, and data sources can be employed within operating environment 100 within the scope of the present disclosure. Each may comprise a single device or multiple devices cooperating in a distributed environment, such as the distributed computing device 800 in FIG. 8. For instance, server 106 is provided via multiple devices arranged in a distributed environment that collectively provide the functionality described herein. Additionally, other components not shown may also be included within the distributed environment.

User devices 102*a* and 102*b* through 102*n* can be client user devices on the client-side of operating environment 100, while server 106 can be on the server-side of operating environment 100. Server 106 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 106 and user devices 102*a* and 102*b* through 102*n* remain as separate entities.

In some embodiments, user devices 102*a* and 102*b* through 102*n* comprise any type of computing device capable of use by a user. For example, in one embodiment, user devices 102*a* and 102*b* through 102*n* are the type of computing device 700 described in relation to FIG. 7 herein. By way of example and not limitation, a user device is embodied as a personal computer (PC), a laptop computer, a mobile device, a smartphone, a smart speaker, a tablet computer, a smart watch, a wearable computer, a personal digital assistant (PDA) device, a virtual-reality (VR) or augmented-reality (AR) device or headset, music player or an MP3 player, a global positioning system (GPS) device, a video player, a handheld communication device, a gaming device or system, an entertainment system, a vehicle computer system, an embedded system controller, a camera, a remote control, an appliance, a consumer electronic device, a workstation, any other suitable computer device, or any combination of these delineated devices.

In some embodiments, data sources 104*a* and 104*b* through 104*n* comprise data sources and/or data systems, which are configured to make data available to any of the various constituents of operating environment 100 or system 200 described in connection to FIG. 2. For instance, in one embodiment, one or more data sources 104*a* and 104*b* through 104*n* provide (or make available for accessing) user-content data to briefing content handler 210 of FIG. 2. Certain data sources 104*a* and 104*b* through 104*n* are discrete from user devices 102*a* and 102*b* through 102*n* and server 106 or are incorporated and/or integrated into at least one of those components. In one embodiment, one or more of data sources 104*a* and 104*b* through 104*n* comprise one or more sensors, which are integrated into or associated with one or more of the user device(s) 102*a*, 102*b* through 102*n* or server 106. Examples of data made available by data sources 104*a*, 104*b* through 104*n* are described further in connection to briefing content handler 210 or storage 225 of FIG. 2.

Figure 2:
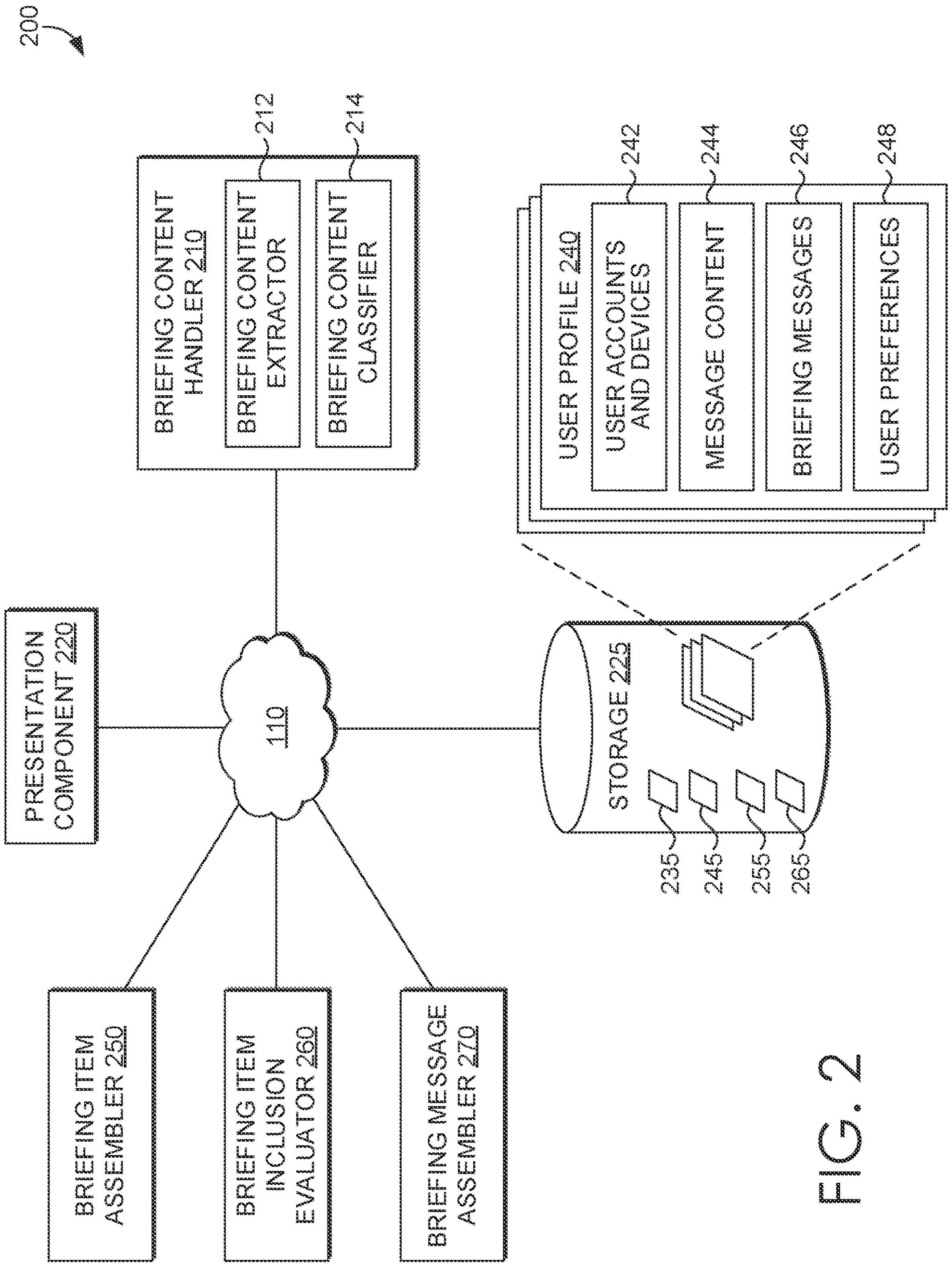
FIG. 2 is a diagram depicting an example computing architecture suitable for implementing aspects of the present disclosure.

Operating environment 100 can be utilized to implement one or more of the components of system 200, as described in FIG. 2, including components for accessing and collecting information to be considered for briefing content; assembling the collected information into candidate briefing items; receiving user preferences, and/or similar categories of data regarding message content features; evaluating the candidate briefing items for inclusion in a briefing message; assembling and formatting a briefing message; and/or consuming or presenting content to users. Operating environment 100 can also be utilized for implementing aspects of methods 400, 500, and 600 in FIGS. 4, 5, and 6, respectively.

Referring now to FIG. 2, with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements can be omitted altogether for the sake of clarity. Further, as with operating environment 100, many of the elements described herein are functional entities that are implemented as discrete or distributed components or in conjunction with other components, and in any suitable combination and location. In one example, the computing device 700 of FIG. 7 and the distributed computing device 800 of FIG. 8 perform aspects of the system 200 of FIG. 2.

Example system 200 includes network 110, which is described in connection to FIG. 1, and which communicatively couples components of system 200, including briefing content handler 210, presentation component 220, user profile 240, briefing item assembler 250, briefing item inclusion evaluator 260, briefing message assembler 270, and storage 225. In some embodiments, briefing content handler 210 (including its subcomponents 212 and 214), presentation component 220, user profile 240, briefing item assembler 250, briefing item inclusion evaluator 260, briefing message assembler 270, are embodied as compiled computer instructions or functions, program modules, computer software services, or an arrangement of processes carried out on one or more computer systems, such as distributed computing device 800, described in connection to FIG. 8.

In one embodiment, the functions performed by components of system 200 are associated with one or more computer applications, services, or routines, such as an online meeting application, an email application, a communications or collaboration application, or an organizational explorer application. In these embodiments, the functions operate to determine or provide message content 244 or briefing messages 246. Certain applications, services, or routines operate on one or more user devices (such as user device 102*a* of FIG. 1) or servers (such as server 106 of FIG. 1). Moreover, in some embodiments, these components of system 200 are distributed across a network, including one or more servers (such as server 106 of FIG. 1) and/or client devices (such as user device 102*a* of FIG. 1) in the cloud, such as described in connection with FIG. 8, or reside on a user device, such as user device 102*a* of FIG. 1. Moreover, functions performed by these components or services carried out by these components can be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), and so forth. Additionally, although functionality is described herein with regard to specific components shown in example system 200, it is contemplated that in some embodiments, functionality of these components is shared or distributed across other components.

Continuing with FIG. 2, briefing content handler 210 is generally configured with briefing content logic 235 to access or receive (and in some cases also identify) user-content data, which includes data associated with a user, data associated with a user account, or data associated with one or more data sources, such as data sources 104*a* and 104*b* through 104*n* of FIG. 1. In some embodiments, briefing content handler 210 is employed to facilitate the accumulation of data across a variety of sources or data of a particular user or group (or in some cases, a plurality of users including crowdsourced data) such as briefing item assembler 250, briefing item inclusion evaluator 260, or the briefing message assembler 270. In one embodiment, the data is received (or accessed), and optionally accumulated, reformatted, and/or combined by briefing content handler 210 and stored in one or more data stores such as storage 225, where it is available to other components of system 200. For example, the user-content data is stored in or associated with a user profile 240, as described herein, such as in message content 244 of user profile 240, or is stored in or associated with the message content 244 or briefing messages 246, as described herein. In some embodiments, any personal identifying data (for example, user data that specifically identifies particular users) is either not uploaded or provided from the one or more data sources, is not permanently stored, is de-identified, and/or is not made available to other components of system 200. In addition or alternatively, a user can opt into or out of services provided by the technologies described herein and/or select which user-content data and/or which sources of user-content data are to be captured and utilized by these technologies.

User accounts and devices 242 generally include information about user devices accessed, used, or otherwise associated with a user, and/or information related to user accounts associated with the user, for example, which are used for accessing or collecting user data for a user. For example, information of user accounts and devices 242 comprises at least one of: online or cloud-based accounts (for example, email, social media) such as a Microsoft® MSA account or a Microsoft 365 account; other accounts, such as entertainment or gaming-related accounts (for example, Xbox®, Netflix®, online game subscription accounts, or similar account information); communication data that relates to accounts, such as user emails, texts, instant messages, calls, other communications, and other content; social network accounts and data, such as news feeds; online activity; and calendars, appointments, application data, other user accounts, or the like. Some embodiments of user accounts and devices 242 store information across one or more databases, knowledge graphs, or data structures. As described herein, in one example, the information stored in user accounts and devices 242 is accessed by briefing content handler 210 to extract information and classify the information.

The briefing content extractor 212 is generally configured with briefing content logic 235 to extract user-specific features and user-content data from user-content data stored in the user accounts and devices 242. In one example, the briefing content extractor 212 extracts user-specific features and user-content data, and additionally formats the user-specific features and user-content data into a structure that is consumed by the briefing item assembler 250, as well as other components discussed herein. In one example, the briefing content extractor 212 accesses previously unsent content, such as content which has not been used to generate previous briefing message communicated to the user. In one example, the briefing content extractor 212 extracts user-specific features from the previously unsent content.

In some embodiments, the briefing content extractor 212 extracts user-specific features from a data source (such as data source 104*a* of FIG. 1, which can be a meeting hosting site, a social networking site, a professional networking site, a corporate network, an organization's intranet or file share, or other data source containing user-content data) or determined via one or more sensors (such as sensors 103 and 105 of FIG. 1), which are on or associated with one or more user devices (such as user device 102*a* of FIG. 1), servers (such as server 106 of FIG. 1), and/or other computing devices. In one example, a sensor includes a function, routine, component, or combination thereof for sensing, detecting, or otherwise obtaining information such as user-content data from a data source 104*a*, and is embodied as hardware, software, or both. By way of example and not limitation, user-content data includes data that is sensed, detected, or determined from one or more sensors (referred to herein as sensor data), such as location information of mobile device(s), properties or characteristics of the user device(s), user-content data for example: app usage; online activity; searches; voice data such as automatic speech recognition; activity logs; communications data, including calls, texts, chats, messages, and emails; document comments; website posts; other user-content data associated with communication events, including user history, session logs, application data, contacts data, calendar and schedule data (including blocks of time during which nothing is schedule or blocks of time marked as occupied because an event is scheduled), notification data, social-network data, e-commerce activity, user-account(s) data (which in one example includes data from user preferences or settings associated with a personalization-related application, a personal assistant application or service, an online service or cloud-based account such as MICROSOFT OFFICE 365®, an entertainment or streaming media account, a purchasing club or services); global positioning system (GPS) data (for example, used to determine the length of travel time to an event scheduled as part of the calendar and schedule data); other user device data (which can include device settings, profiles, network-related information, payment or credit card usage data, or purchase history data); other sensor data that is sensed or otherwise detected by a sensor (or other detector) component(s), including data derived from a sensor component associated with the user (including location, motion, orientation, position, user-access, user-activity, network-access, user-device charging, or other data that is capable of being provided by one or more sensor components); data derived based on other data (for example, location data that can be derived from Wi-Fi, cellular network, or IP address data), and nearly any other source of data that is sensed, detected, or determined as described herein.

The briefing content extractor 212 can access user-content data, particularly in the form of context data or contextual information regarding a particular user, from one or more sensors and/or computing devices associated with the user. In some embodiments, briefing content handler 210, briefing item assembler 250 or its subcomponents, briefing item inclusion evaluator 260, or other components of system 200 determine interpretive data received from user-content data or message content 244. Interpretive data corresponds to data utilized by the components or subcomponents of system 200 that comprises an interpretation from processing raw data, such as a task, reminder, or agenda item extracted from raw audio or video, calendar and scheduling data, and/or topic information interpreted from user-content data. Interpretive data can be used to provide context to user-content data or user-specific features extracted from the user-content data, which can support determinations or inferences carried out by components of system 200. In one embodiment, the interpretive data can be associated with and stored with respect to the corresponding user-specific features or user-content data as metadata. Moreover, it is contemplated that some embodiments of the disclosure utilize user-specific features and user-content data, alone or in combination with interpretive data, for carrying out the objectives of the subcomponents described herein. It is also contemplated that some user-content data are processed by the sensors or other subcomponents of briefing content handler 210 not shown, such as for interpretability by briefing content handler 210. However, embodiments described herein do not limit the user-content data to processed data and include raw data or a combination thereof, as described above.

In some embodiments, briefing content extractor 212 receives user-content data from certain streams or signals. A "signal" can be a feed or stream of user-content data from a corresponding data source. For example, a user signal could be from a smartphone, a home-sensor device, a GPS device (for example, for location coordinates), a vehicle-sensor device, a wearable device, a user device, a gyroscope sensor, an accelerometer sensor, a camera device (for example, of a computing device), a calendar service, an email account, a credit card account, or other data sources. In some embodiments, briefing content handler 210 receives or accesses data continuously, periodically, as it becomes available, or as needed. In some embodiments, the user-content data is stored in storage 225, such as in message content 244.

Some embodiments of briefing content extractor 212, or more generally briefing item assembler 250, can determine interpretive or semantic data from the user-content data, which is used to assemble a candidate briefing item (by briefing item assembler 250) or other structured user data. For example, while a user-content data indicates a location visited by the user, a semantic analysis determines information about the location, such as the location is a third party website, a social media site, and the like, or to determine other data. Thus, in one embodiment, the semantic analysis determines additional user-specific features that are semantically related to other data and used for further characterizing the user or for determining a context.

The briefing content classifier 214 is generally configured with briefing content logic 235 to classify user-specific features extracted from user accounts and devices 242 by the briefing content extractor 212. In some embodiments, the briefing content classifier 214 employs any suitable classification methodology, such as a deep learning model, a neural network model (such as a Convolutional Neural Network (CNN) model), a logistic regression model, a support vector machine model, and the like, to classify the user-specific features. In one embodiment, the briefing content classifier 214 classifies the extracted user-specific features based on any suitable classification features, such as source of information, format of information, and the like. In the context of classification based on source of information, in one example, user-specific features from FACEBOOK® may be automatically classified as social media information based on the source being FACEBOOK®. In the context of classification based on format of information, in one example, a word processing document having tracked changes from a plurality of users is automatically classified as a collaboration document.

By way of example and without limitation, user-specific features are classified by the briefing content classifier 214 into any suitable classification including: contact information (for example, email, instant message, phone, and so forth associated with meeting attendees or meeting invitees, and can also specify a person's communication preferences); location information (for example, a person's current location or location of a particular office where they work); presence; user-related activity (for example, activity relevant to a user or group member or other user-related activity that is determined via a user device, such as user device 102*a* of FIG. 1); communications information (for example, past email, meetings, chat sessions, communication patterns or frequency, information about a user or other meeting attendees/invitees that the user had a meeting with or has an upcoming meeting with, or information about communications between a group member and one or more users); files access (for example, a file created, modified, or shared); social media or online information (for example, a post to a social-media platform or subscription information); information regarding topics of interest to a user; task-related information (for example, an outstanding task that the user has with regard to a project or workflow associated with the user, including a milestones part of an agile or waterfall methodology, internal or external project deadlines, optional tasks, and so forth); group information (for example, common project teams, work groups, backgrounds, education, interests, hobbies, or any suitable information shared between other users).

Message content 244, in one example, comprises any information to be considered for inclusion in a briefing message and that is related to a person and that person's accounts, as defined by user accounts and devices 242. In one embodiment, the user-specific features extracted from user accounts and devices 242 by the briefing content extractor 212 are stored as message content 244. In one embodiment, the classified user-specific features are stored as message content 244. The message content 244 is accessible by the components of system 200, such as the briefing item assembler 250 to assemble a briefing item.

In one embodiment, a semantic analysis is performed on at least a portion of the user-specific features to characterize aspects of the user-content data and user-specific features. For example, in some embodiments, user-specific features are classified or categorized (by type, by time frame or location, as work-related, as home-related, by themes, by related entities, as being associated with another user(s) (such as communication to or from another user) and/or based on relationship of the other user to the user (for example, family member, close friend, work acquaintance, boss, or the like, or other categories), or related features are identified for use in determining a similarity or relational proximity to other user-related activity events). In some embodiments, a semantic analysis utilizes a semantic knowledge representation, such as a relational knowledge graph. For example, a semantic analysis utilizes semantic analysis logic, including rules, conditions, or associations to determine semantic information related to a user's activity. For example, a user-related activity event comprising a message sent to another meeting attendee during the meeting is characterized as a work-related activity, which is used to infer a relationship that the user works with the message recipient.

Briefing item assembler 250 is generally configured with item assembly logic 245 to assemble the message content 244 into a candidate briefing item for potential inclusion in a briefing message. In one example, the briefing item assembler 250 assembles a candidate briefing item with a determined heading and description (or summary). The heading and description may be determined based on the briefing message content. In one embodiment, the briefing item assembler 250 receives the message content 244 and associated metadata, such as the classifications assigned by the briefing content classifier 214. For example, a portion of message content 244 is classified as a meeting. Based on this classification, embodiments of the briefing item assembler 250 assemble a candidate briefing item that includes a heading and a description. The heading and/or description of the candidate briefing may include meeting-specific features, such as meeting attendees, a date and time of the meeting, a location of the meeting, an agenda, commitments the user has for this meeting, whether the user is a speaker, and so forth.

Based on the briefing item type (or the particular message content 244 used to assemble a briefing item), certain briefing items (or their content) are associated with actions that can be taken by the user (for instance, the recipient of the briefing communication). For example, a briefing item (or message content 244) that is a commitment, such as a promise by the user to send a file to a particular person, has actions the user can take in order to fulfil the commitment; for instance, sending the file to that particular person. Accordingly, some embodiments of briefing item assembler 250 (or item assembly logic 245) evaluate the message content 244 to determine if it is actionable. Actionable briefing items include, without limitation, commitments by the user, certain types of reminders, and certain types of insights. In some embodiments where the briefing item is a type that is actionable, a briefing item description includes a summary of steps or actions that the user can take in regards to the message content 244 of the briefing item. For example, some embodiments of briefing item assembler 250, which may use item assembly logic 245, generate a briefing item description that includes specific instructions or next actions for the user to take in regards to the briefing item. In some embodiments, the summary of next actions comprises selectable options facilitating the user's performance of an action regarding the briefing item. For example, with reference to FIG. 3C, briefing item 374 includes suggested next actions 374C.

Returning to FIG. 2, in some embodiments, the briefing item assembler 250 assembles the candidate briefing item based on message content 244 sharing a degree of similarity. Some embodiments further utilize metadata from the message content 244. For instance, a degree of similarity first is determined automatically and used to indicate a possibility of two or more pieces of message content being associated so as to be included as part of a candidate briefing item. Then the aspect or segment may be further analyzed by briefing item assembler 250 using a machine learning model that is trained on instances of message content 244 that was previously combined to form a candidate briefing item. Based on this further analysis, two pieces of message content 244 can be associated and included as part of a candidate briefing item. In this manner, a candidate briefing item can be assembled from data from different sources.

In one embodiment, the degree of similarity comprises a similarity (or dissimilarity) measure. For example, the similarity measure is determined using a similarity function, distance measurement, clustering, correlation, dissimilarity matrix, statistical relatedness, or other suitable measure of relatedness. For instance, one embodiment uses a semantic similarity. In one embodiment, the degree of similarity is expressed as a percentage, ratio, threshold value, or any combination thereof. In one embodiment, the degree of similarity is expressed as a threshold percentage between features, such that a higher percentage (for example, higher than a first threshold) of similarity between a plurality of pieces of message content 244 correspond to the highest possible likelihood that the pieces of message content 244 should be assembled into a candidate briefing item. The threshold percentage can be any suitable percentage, such as 30%, 40%, 50%, 60%, 70%, 80%, 90%, 95%, 99%, or any percentage value in between, lower, or higher.

To help illustrate, suppose a task for the user is due to Jane Doe by Mar. 19, 2023, but the calendar information for Jane Doe indicates that Jane Doe is out on spring break between Mar. 17, 2023 and Mar. 24, 2023. In this example, the task is a first piece of meeting content and Jane Doe's calendar information is a second piece of meeting content. Assuming only the person and the date were the two features used to calculate the degree of similarity, this example has a 100% similarity between both pieces of meeting content because both pieces of meeting content implicate the same person (in this example, Jane Doe) and have overlapping dates (in this example, Mar. 19, 2023). Accordingly, in this example, the briefing item assembler 250 assembles a candidate briefing item that is an updated task due date of Mar. 16, 2023 based on Jane Doe's calendar.

In another example, suppose the percentage of similarity is below the threshold percentage of similarity. In response to determining that the percentage of similarity is below the percentage threshold, certain embodiments of the briefing item assembler 250 do not associate the pieces of message content 244 with each other. As a result, the pieces of the meeting content that do not have a degree of similarity above the threshold percentage are not associated and used to generate a candidate briefing item.

In some embodiments, the candidate briefing items are stored as message content 244 in storage 225. For example, after the briefing content handler 210 generates and stores the extracted and classified message content as message content 244, the briefing item assembler 250 can access this message content 244 to determine additional metadata about the message content and also generate the candidate briefing items discussed herein. In one embodiment, generating the candidate briefing items includes combining pieces of the extracted and classified message content. For each candidate briefing item, the briefing item assembler 250 generates a heading, a summary, and metadata. In the context of the metadata, the briefing item assembler 250 assigns to the candidate briefing item metadata indicative of the classification determined by the briefing content classifier 214. In some embodiments, the candidate briefing items are classified as at least one of: a to-do item to prepare for a meeting, a matter a user needs to follow up on, calculated focus time, determined meditation time, weekly outlook, catch-up session for the user to catch-up with his/her team, and settings, among other items.

In some embodiments, the candidate briefing item includes a briefing item, such as a scheduling task, that is directly integratable with a productivity application via a corresponding application programming interface (API). Other example candidate briefing items include an agenda item, an informational article, a suggestion for improving productivity, and an analysis of a team associated with the particular user.

Figure 3A:
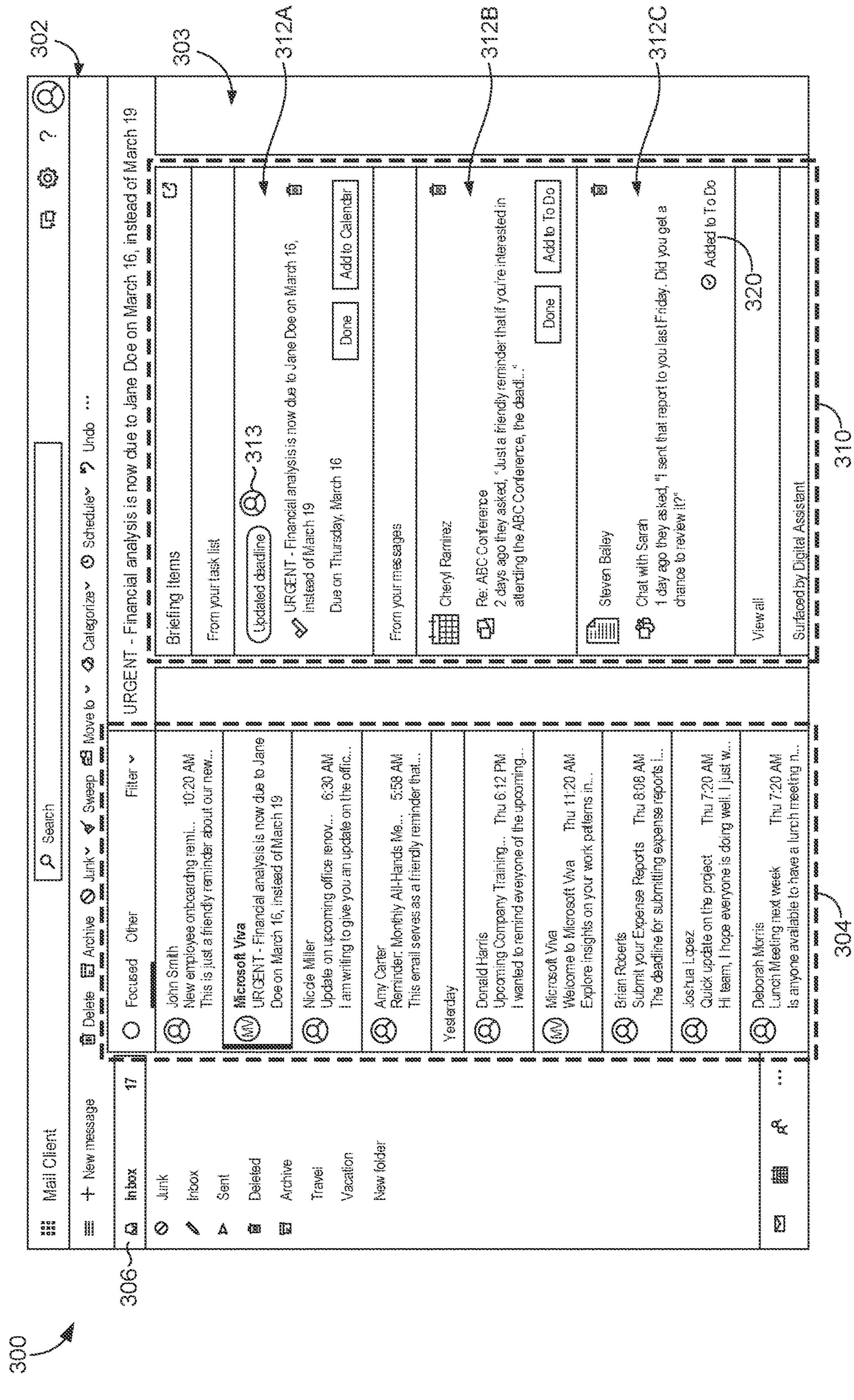
FIG. 3A illustratively depicts an example schematic screenshot from a personal computing device showing aspects of an example graphical user interface that presents a briefing message, in accordance with an embodiment of the present disclosure.

Continuing the example above regarding a task originally being due to Jane Doe on Mar. 19, 2023, the briefing item assembler 250 generates a heading indicative of the updated due date of Mar. 16, 2023 for Jane Doe. For example, the heading indicates "URGENT-Task X is now due to Jane Doe on March 16, instead of March 19." In this example, the briefing item assembler 250 generates a summary indicative of a more detailed overview of the updated due date of March 16 for Jane Doe. For example, the summary provides more context, such as progress in completing Task X, a reason for the updated scheduled (in this example, Jane Doe being out for Spring break), and suggestions for how to meet this updated deadline, to name a few. In some embodiments, the briefing item assembler 250 generates an image associated with the candidate briefing item based on metadata associated with the message content 244 used to form the candidate briefing item. In this example, the image is an image of Jane Doe to remind the user who the task is owed to. This image 313 of Jane Doe is illustrated in FIG. 3A. In some embodiments, the candidate briefing item, its heading, its summary, its image, and its metadata is stored in storage 225 as message content 244.

Continuing with FIG. 2, the briefing item inclusion evaluator 260 is generally configured with message-item inclusion logic 255 to evaluate each candidate briefing item stored as message content 244. In one embodiment, the candidate briefing items are evaluated for inclusion in a briefing message. As used herein in one example, briefing items to be included in the briefing message are referred to as target "briefing items." The briefing item inclusion evaluator 260 calculates, based on the message-item inclusion logic 255, a score for the candidate briefing items based on any number of scoring factors, including but not limited to, importance to the user, urgency, freshness, uniqueness, user engagement with related candidate items, and organizational input. In one example, the briefing item inclusion evaluator 260 calculates a score for each of a plurality of scoring factors (such as importance to the user, urgency, freshness, uniqueness, user engagement with related candidate items, and organizational input). Alternatively, in one example, the briefing item inclusion evaluator 260 calculates one score that accounts for any number of factors, such that different factors are weighed differently or similarly. In one example, the score or scores are stored as metadata in message content 244 and indexed based on the corresponding candidate briefing item.

In the context of a score based on urgency or importance to the user, an importance level can indicate how important or imperative it is that a user addresses the candidate briefing item, while an urgency level may indicate how soon the user should address or engage with the candidate briefing item. Some embodiments of briefing item inclusion evaluator 260 determine a score corresponding urgency, importance, or both. Moreover, an unaddressed event may become more urgent as a deadline approaches (such as the updated deadline of completing the task for Jane Doe discussed above), and the importance level and/or urgency level may be updated based on changes detected in contextual information, current user data, the user's response, newly detected user patterns, or new unaddressed events that are determined to be related to an already outstanding event. For example, a missed call from a boss (in the example above, Jane Doe) following up on an unresponded email may indicate a higher urgency level for responding to the briefing message.

In some embodiments, briefing item inclusion evaluator 260 calculates a score based on urgency or importance to the user (which is embodied, in one example, as a score or numerical value) using information about the unaddressed event, which is received, for example, from briefing content handler 210 and classified by briefing content classifier 214, or other data provided by briefing item assembler 250, user profile 240, or any other component of system 200. For example, briefing item inclusion evaluator 260 considers similar unaddressed events and their frequency (such as repeated missed calls or an unresponded email and missed call from the same contact); previous responses to similar unaddressed candidate briefing items from the user or other users, which can indicate a level of importance or urgency, based on how soon the user(s) responded after the similar briefing items occurred; or pattern information such as whether the unaddressed event is associated with a pattern or whether it is unexpected. For example, where a boss usually calls every Monday evening, an unaddressed event corresponding to where the user missed answering a call from the boss on a particular Monday evening may be determined to have less importance than a missed call from the boss that occurs in the middle of the work day (for example, the boss is calling at an unusual time of day that doesn't follow patterns associated with when he/she usually calls).

Embodiments of briefing item inclusion evaluator 260 also or alternatively consider location information, time of day, and other contextual information (for example, a higher level of importance and urgency is determined where the boss called from the hospital or the user's boss called during the middle of the night); user settings or preferences regarding the importance or urgency of addressing certain events, or events that are associated with certain variables, which are explicitly specified by the user or learned (for example, an importance level assigned to communications from an executive or all communications from close friends); and the user's relation to the contact-entity (for example, an acquaintance, a close friend, family member, co-worker, boss, chief executive officer (CEO) of the user's employer), which includes how the user has identified this entity in a contacts roster or social media account and/or the user's history for communicating with this contact and level of contact with the entity. For example, a missed call from a user's CEO is determined to be more important than a missed call from a salesman who has no previous contact with the user.

In some embodiments, the score indicative of the urgency level or importance level are determined from contextual information based on context features associated with the unaddressed event (including extracted keywords or other context features extracted from similar events). For example, keywords and other context features are extracted by briefing item inclusion evaluator 260 to determine information about user responses for one or more users, such as information about how users typically respond (including how quickly they respond), based on certain keywords or other context features associated with the candidate briefing item. Additionally some keywords are predetermined to indicate possible urgency (such as "urgent," "immediate," or similar words that are present in the communications).

In some embodiments, using the received information described in the preceding two paragraphs, a degree of urgency or importance is determined for an unaddressed event of the candidate briefing item and used for determining a value representing the level of urgency or importance. For example, the level of importance or urgency for an event is determined relative to previous responses of the user or similar responses of other users, including handling unaddressed events previously determined to be urgent or important or previously determined to be not urgent or unimportant. In this way, certain determined levels span a range (such as 1 to 10 or "Not Urgent" to "Extremely Urgent," for example) based on a comparison to similar events and extremes (urgent/important events and not urgent/unimportant events) and how those events were handled.

Further, in some embodiments, one or more thresholds are applied for determining whether the determined urgency level value or importance level value is sufficient enough to elevate a candidate briefing item to a target briefing item to be included in the briefing message. For example, a user desires not to receive briefing items corresponding to unaddressed events having low importance (such as a missed call from a random salesman). Thus, in some embodiments, when the importance level is low, no action is required in response to identifying an out-of-routine event. Moreover, the threshold values may vary based on the context and notification content, such as the recommended response for the user to address the unaddressed event of a candidate briefing item. In embodiments, using urgency or importance thresholds, the thresholds are determined based on predetermined rules, user history, data from other users, or user preferences or settings, such as further described below.

In some embodiments, a score based on an urgency level or importance level has an associated probability or confidence indicating a likelihood of the determined urgency or importance. In one example, the confidence is determined based on the amount of contextual information potentially indicating urgency or importance and/or the magnitude (or weight) associated with specific pieces of contextual information. For example, a candidate briefing item based on an unanswered email from the user's boss that is designated as a "high importance" message would have more weight than a candidate briefing item based on an email from the boss with normal importance. In some embodiments, the confidence is used for prioritizing candidate briefing items for presentation to a user. For example, where two or more candidate briefing items share a similar urgency level or importance level, the one that has a higher confidence takes priority (e.g., may be shown first or sooner) over the other.

In some embodiments, briefing item inclusion evaluator 260 calculates a score based on freshness to the user (which is embodied as a score or numerical value) using information about the candidate briefing item, which can be received from briefing content handler 210 and classified by briefing content classifier 214, or other data provided by briefing item assembler 250, user profile 240, or any other component of system 200. In some embodiments, freshness is determined on how recently information used to generate the candidate briefing item was made available, such that a candidate briefing item generated on newer information has a higher freshness score than a candidate briefing item generated on older information.

In some embodiments, briefing item inclusion evaluator 260 calculates a score using message-item inclusion logic 255 based on uniqueness to the user (which is embodied as a score or numerical value) using information about the candidate briefing item which is received, for example, from briefing content handler 210 and classified by briefing content classifier 214, or other data provided by briefing item assembler 250, user profile 240, or any other component of system 200. In one embodiment, the uniqueness is computed as a rarity score indicating how uncommon the candidate briefing item is for a given reference group. For example, the rarity score for a particular candidate briefing item is determined based on a comparison of metadata or user-specific features of the particular candidate briefing item and of previous target briefing items.

To help illustrate, suppose that a candidate briefing item includes a financial task to complete for Jane Doe, and the user has previously not worked with Jane Doe or worked on any financial tasks. Accordingly, this candidate briefing item would have a higher uniqueness score (than a standard candidate briefing item) because the user has not previously worked with Jane Doe or on a financial task. In some embodiments, determining the uniqueness score is based on the distance of a candidate briefing item and previous target briefing items, such as using a graph or database. In this example, candidate briefing items that are outside a threshold of similarity (for example, a similarity threshold, which is defined or based on the particular classification of a candidate briefing item, a group to which the user belongs, and/or reference group, such as a threshold distance of similarity or within a specified range of variance) to previous target briefing items are determined to be unique.

In some embodiments, briefing item inclusion evaluator 260 determines a uniqueness score by determining a hierarchical relationship similarity such as a genus-species is determined for a candidate briefing item and used for the comparison to previous target briefing items to determine the uniqueness score. For example, if a candidate briefing item includes information regarding a deadline for a banking task for Jane Doe and a target briefing item from the previous day includes information regarding a deadline for a purchase order for Jane Doe, then a comparison of the briefing items determines that both briefing items are at least somewhat related, because the purchase order and the banking task are species within a genus of financial tasks. In this example, because these two briefing items share a genus, the uniqueness score for the candidate briefing item would be lower (than a candidate briefing item not sharing a genus with previous target briefing items). In some embodiments, a table-lookup or index is used to determine a genus-species for a candidate briefing item or a semantic analysis on the candidate briefing item are used to determine a genus or a set of one or more potential species.

In some embodiments, briefing item inclusion evaluator 260 calculates a score, using message-item inclusion logic 255, based on level of user engagement (which is embodied as a score or numerical value) using information about the candidate briefing item, which is received from briefing content handler 210 and classified by briefing content classifier 214, or other data provided by briefing item assembler 250, user profile 240, or any other component of system 200. In one example, user engagement refers to whether the user clicked on, read, toggled through, hovered over a selection, and so forth, with respect to a particular briefing item or corresponding GUI element. In one embodiment, the level of user engagement is based on historical data indicative of a level of user engagement with previous target briefing items classified similar to a particular candidate briefing item. For example, previous briefing messages includes first target briefing items indicative of to-do items to prepare for meetings and second target briefing items indicative of determined meditation time. Continuing this example, the user engages with about 95% of the first target briefing items, but only about 10% of the second target briefing items. In this example, a candidate briefing item similarly classified as the first target briefing items (for example, indicative of to-do items to prepare for meetings) has a higher user engagement score than a candidate briefing item similarly classified as the second target briefing items (for example, indicative of determined meditation time). In this example, the level of user engagement is directly proportional to the score calculated by the briefing item inclusion evaluator 260.

In one embodiment, the briefing item inclusion evaluator 260 determines, for an upcoming meeting assigned to the user, whether the user is a presenter, whether the user will actively participate (for example, by talking, engaging with the chat, and so forth) in the meeting, whether the user is merely listed as an optional attendee, or whether the user has declined to attend the meeting. In this example, the briefing item inclusion evaluator 260 determines the level of user engagement based on whether the user will engage during a meeting and to what extent the user will engage. For example, the briefing item inclusion evaluator 260 determines that a candidate briefing item related to a meeting for which the user is presenting has a higher score than a candidate briefing item related to meeting for which the user is listed as an optional attendee.

In some embodiments, briefing item inclusion evaluator 260 calculates a score, using message-item inclusion logic 255, based on organizational input (which is embodied as a score or numerical value) using information about the candidate briefing item, which, in one example, is received from briefing content handler 210 and classified by briefing content classifier 214, or other data provided by briefing item assembler 250, user profile 240, or any other component of system 200. Example organizational inputs include a user's role within an organization, preferences and settings controlled by an administrator (such as the boss of the user), and so forth. For example, suppose all members of a team are associated with a particular deadline for a task, such as task X to be completed for Jane Doe on March 16. Further suppose that, as part of completing task X, there is an organizational off-site meeting (for example, a meeting located outside the premises of the organization) on a particular day. In this example, the briefing item inclusion evaluator 260 calculates the score based on the user-specific feature indicating the user's membership and role within the team, which is based on an organizational chart or the user's collaboration network data, which is stored in storage 225.

In another example, suppose that Jane Doe is an organizational administrator. In some embodiments, the briefing item inclusion evaluator 260 automatically elevates the status of a candidate briefing item to that of a target briefing item for inclusion in a briefing message. For example, Jane Doe selects an option on an email service to automatically cause a candidate briefing item associated with a communication from Jane Doe (in this example, the organizational administrator) to be included in a subsequent briefing message as a target briefing item. In this example, the candidate briefing item associated with a communication from Jane Doe includes a higher score than other types of communications based on the input from the organizational administrator (in this example, Jane Doe). In the context of multiple scores being calculated, certain scores based on the input from the organizational administrator are weighed higher than other types of scores so as to cause the corresponding briefing item to be surfaced and included in the briefing message.

In some embodiments, the briefing item inclusion evaluator 260 ranks the candidate briefing items based on their corresponding scores. In one embodiment, the briefing item inclusion evaluator 260 chooses a threshold number of the ranked candidate briefing items for inclusion in the briefing message as target briefing items. For example, a non-null subset of candidate briefing items that satisfy a threshold number of briefing items is included as the target briefing items. In one embodiment, the threshold number is a fixed quantity set by an organization or organizational administrator.

In another embodiment, the threshold is based on a device used by the user most often. For example, if the user accesses their email via a mobile device that includes less display space (due to a smaller screen size or a smaller screen-size-to-pixel-ratio) than a desktop or laptop device, then the briefing item inclusion evaluator 260 sets the threshold number as less than the threshold number if the user were to access their email via a desktop. Accordingly, embodiments of the briefing item inclusion evaluator 260 determined that fewer of the candidate briefing items should be included in a briefing message when the user views his/her email on a mobile device. In some embodiments, the order in which the candidate briefing items are presented on the briefing message is based on the ranking.

In some embodiments, the briefing item inclusion evaluator 260 automatically includes certain candidate briefing items of certain classifications in a briefing message. In one embodiment, a candidate briefing item determined to be of a certain classification is automatically determined to be a target briefing item. In one example, a candidate briefing item that is classified as at least one: a to-do item to prepare for meetings, a matter a user needs to follow up on, calculated focus time, determined meditation time, weekly outlook, catch-up session for the user to catch-up with his/her team, and settings, among others, is automatically determined to be a target briefing item.

In some embodiments, the briefing item inclusion evaluator 260 automatically includes certain candidate briefing items having at least a threshold score in a briefing message. In one embodiment, a candidate briefing item determined to have a score above a score threshold is automatically determined to be a target briefing item. For example, the scores are normalized to be between 0 and 100, such that only candidate briefing items above a score of 90, or any other score threshold, are determined to be target briefing items.

Continuing with FIG. 2, briefing message assembler 270 is generally configured with briefing message assembly logic 265 to generate a briefing message. In some embodiments, generating the briefing message includes assembling the target briefing items (determined by the briefing item inclusion evaluator 260) into a briefing message. Although certain embodiments are discussed in the context of a briefing message, it should be understood that these embodiments are applicable to any forms of electronic messages.

In one embodiment, the briefing message assembler 270 employs briefing message assembly logic 265 to determine a headline of the briefing message. Embodiments of the briefing message assembler accesses message content 244. In one embodiment, determining the headline includes determining a format for the headline. In one example, the briefing message assembler 270 receives the target briefing item (from message content 244 of user profile 240) that has the highest score (or that is ranked the highest). In this example, the briefing message assembler 270 confirms that information is available about the target briefing item. Example information includes information assembled by the briefing item assembler 250 based on the user-specific features determined by the briefing content handler 210. In this manner, the briefing message assembler can avoid using a briefing item for which corresponding information is unavailable in the headline. If the briefing message assembler 270 determines that no information is available for the highest scored (or ranked) target briefing item, embodiments of the briefing message assembler 270 then determines whether information is available for the next highest ranked item.

In some embodiments, the briefing message assembler 270 generates a headline based on templates for headlines that are predetermined. In one example, the headline templates are vetted or otherwise preapproved by an administrator to ensure that the templates are safe and inclusive. In another example, the headline templates are automatically analyzed by briefing message assembler 270 to verify safety and inclusion. Example headline templates include a brief description of the highest scored target briefing item included in the body, an indication of an urgency level, or a specific arrangement of text, and may further include a slot (for example, "{ . . . }") for including the recipient's name or other detail that is specific to the recipient. In the context of a specific arrangement of text, a headline template includes, for example, any of the following example shells:

(1) {Task name} is due on {specific due date} to your {list role of person} {name}; such that an example includes "Financial spreadsheet summary is due on March 16 to your manager Jane Doe."

(2) Please {action} for/to {subject associated with action}; such that an example includes "Please prepare for call with shareholders at 9 am."

(3) {Level of urgency}-Deadline {date} for {Task name}; such that an example includes "High Urgency-Deadline Mar. 16, 2023 for Financial Report Analysis."

In one example, the subject line entries, { }, of the shells are filled based on metadata associated with a corresponding target briefing item.

In some embodiments, the briefing message assembler 270 selects a headline template based on a template used for previous briefing messages having similar target briefing items. For example, a prior briefing message includes a first headline template for a highest scored target briefing item corresponding to to-do items to prepare for meetings. In one embodiment, the briefing message assembler 270 determines a format of the headline by accessing a candidate headline template and determining, based at least one on the user-specific features of the target briefing items, template metadata of each candidate headline template of the plurality of headline templates. In one embodiment, the template metadata is compared to target metadata from the at least one target briefing item, and a relatedness between the template metadata and the target metadata is determined based on the comparison. In this example, the format of the headline having the highest or lowest relatedness is selected.

In some embodiments, the message assembler 270 employs briefing message assembly logic 265 to determine a format for the body of the briefing message. In one embodiment, the format for the body of the briefing message is based on templates for the body of the briefing message. In some embodiments, the briefing message assembler 270 generates the body of the briefing message based on templates that are preapproved. In one example, the templates for the body of the briefing message are vetted by an administrator to make sure that the templates are safe and inclusive. In another example, the templates for the body of the briefing message are automatically analyzed by briefing message assembler 270 to verify safety and inclusion. One example template for the body of the briefing message includes a hierarchical arrangement of briefing items grouped by classification and within their classification the target briefing items are listed in order based on their score (such as that illustrated in FIG. 3B). Other example templates for the body of the briefing message include a table showing the candidate briefing items and corresponding information; a list of candidate briefing items ordered based on corresponding scores; candidate briefing items organized based on chronological order (such that those due sooner are generated toward the top of the body of the briefing message); and other example templates defining an arrangement of components or information of the briefing items.

In one embodiment, the briefing message assembler 270 determines a format for the body of the briefing message by accessing a plurality of candidate body templates; determining, based at least on the user-specific features, template metadata of each candidate body template of the plurality of candidate body templates; determining target metadata from the at least one target briefing item; comparing the target metadata to the template metadata of each candidate body template of the plurality of candidate body templates; and determining a relatedness between the template metadata and the target metadata based on the comparison. In one embodiment, the template having the highest or lowest relatedness is selected.

In some embodiments, the briefing message assembler 270 considers the diversity of the types of items so that the briefing message includes diverse types of items. For example, suppose two target briefing items of the same classification are included in the briefing message (as determined by the briefing item inclusion evaluator 260). In this example, the briefing message assembler 270 assigns the highest scored (or ranked) target briefing item toward the top of the body of the briefing message. In one example, the briefing message assembler 270 omits the lower ranked target briefing item of the same classification from the body of the briefing message to reduce the amount of information communicated to the user to save bandwidth associated with communicating and generating the content of the briefing message.

With respect to each target briefing item included in the body of the briefing message, embodiments of the briefing message assembler 270 extracts or generates a summary of the content items based on the items and metadata. For example, suppose a target briefing item includes a meeting summary. In this example, the meeting summary includes a portion of the meeting agenda, meeting transcript, attachments or reading material for the meeting, important attendees, or the like. In one embodiment, the summary is based on templates. In one embodiment, the summary is determined by summarization or extracting key portions of the content items, such as extracting sentences from the meeting transcript and meeting title. In one example, the summary is generated based on an abstractive approach that generates summary that may include words or content not part of the original content items. For example, some embodiments utilize a Large Language Model (LLM) (for example, the third-generation Generative Pre-trained Model (Chat GPT-3)). The LLM may have access to the user profile 240 to generate a summary that is more specific to the user.

In some embodiments, the briefing message assembler 270 includes briefing message assembly logic 265 for formatting the body of the briefing message and the headline based on an optimal alphanumeric character length, bandwidth costs associated with the corresponding target briefing item, and the number of items included. In some embodiments, the briefing message assembler 270 assembles the briefing items based on previous briefing messages. For example, if a previous briefing message included a headline with a reminder for a deadline in three weeks, the briefing message opts out of using this similar headline to provide more variety to avoid the user confusing the briefing message for the previous briefing message. In some embodiments, the briefing message assembler 270 receives an indication of the format or types of briefing messages with which the user has engaged with. For example, if a user shows a pattern of increased level of engagement with a first format, then the briefing message assembler 270 can continue to generate briefing messages based on that format. In this example, a predictive model is employed such that those briefing messages with which the user engaged with receive a positive label, while those briefing messages with which the user did not engage with receive a negative label. These positive and negative labels can be used to train a predictive model (for example, a machine learning model).

Embodiments of the briefing message assembler 270 assemble the briefing message based on the headline and body of the briefing message. Example briefing messages are described below with respect to FIGS. 3A, 3B, 3C, and 3D. In some embodiments, the briefing message assembler 270 assembles a briefing message based on a periodic schedule, for example, defined in user preferences 248. In one example, the user preferences 248 indicate that the user wishes to receive one briefing message each day. In this example, the system 200 generates a briefing message each day during times of non-peak computing activity, such as in the morning before 6:00 am local time or in the evening after 9:00 pm local time.

Example system 200 of FIG. 2 also includes storage 225. Storage 225 generally stores information including data, computer instructions (for example, software program instructions, routines, or services), logic, profiles, and/or models used in embodiments described herein. In an embodiment, storage 225 comprises a data store (or computer data memory). Further, although depicted as a single data store component, storage 225 can be embodied as one or more data stores or in the cloud.

As shown in example system 200 of FIG. 2, storage 225 includes briefing content logic 235, item assembly logic 245, message-item inclusion logic 255, and briefing message assembly logic 265, as previously described. Storage 225 also includes an example embodiment of a user profile 240. Example user profile 240 includes information about user accounts and devices 242, message content 244, briefing messages 246, and user preferences 248. In some embodiments, the information stored in user profile 240 is available to other components of example system 200.

As discussed herein, message content 244, in one example, comprises any information to be considered for inclusion in a briefing message and that is related to a person and that person's accounts, as defined by user accounts and devices 242. In one embodiment, the user-specific features extracted from user accounts and devices 242 by the briefing content extractor 212 are stored as message content 244. In one embodiment, the classified user-specific features that have been classified by the briefing content classifier 214 are stored as message content 244. The message content 244 is accessible by the components of system 200, such as the briefing item assembler 250 to assemble a briefing item.

As discussed herein, briefing messages 246, in one example, comprise the briefing messages that are assembled and generated based on the headline template and the template for the body of the briefing message. In one example, the briefing messages 246 are date-specific such that a different briefing message is generated for each day. In one embodiment, the briefing messages 246 are stored in user profile 240. In this manner, the briefing message is cached or stored so that it can be accessed and assembled by the presentation component 220 to communicate and present to the user the briefing message, for example, during times of low bandwidth to avoid impacting other hosted services.

User preferences 248 generally include user settings or preferences associated with embodiments described herein. By way of example and not limitation, such settings include user configurations or preferences about the various thresholds described herein, confidence values associated with inferences, explicitly defined settings regarding user data used to determine target briefing items, preferences regarding templates used to provide the briefing messages to the user, preferences or configurations regarding the presentation and generation of the briefing messages by computing applications and services used by the user, or other preferences or configuration settings for any of the embodiments described herein.

Example system 200 includes a presentation component 220 that is generally responsible for presenting content including aspects of the message content 244 or briefing messages 246. In one example, the content is presented via one or more presentation components 716, as described in FIG. 7. In one embodiment, presentation component 220 comprises one or more applications or services on a user device across multiple user devices or in the cloud. For example, presentation component 220 manages the presentation of the briefing messages across multiple user devices associated with that user, which the user accesses via a mobile device, laptop, or VR headset, and so forth. For example, presentation component 220 determines which user device(s) content is presented and/or how much content is presented; presents the briefing message generated by the briefing message assembler 270; presents the message content 244 or briefing messages 246; and/or presents any data associated with any other components of system 200. Presentation component 220 presents message content 244 or briefing messages 246, including any substitutions, reorganizations, or highlights as directed by presentation logic, briefing item assembler 250, briefing item inclusion evaluator 260, briefing message assembler 270, and message content 244 or briefing messages 246. In some embodiments, presentation component 220 presents the briefing message, proactively and dynamically, such as when a user interacts with (for example, selects) a GUI feature. For example, presentation component 220 determines when, what, and how to present the briefing message based on a context, briefing item assembler 250, briefing item inclusion evaluator 260, briefing message assembler 270, and/or message content 244 or briefing messages 246.

Some embodiments of presentation component 220 assemble or format the briefing items on the body of the briefing message consumption by a computing application or service. For example, as described previously, briefing item inclusion evaluator 260 determines which candidate briefing items to include as target briefing items in the briefing message (for example, to be displayed via mobile application, VR application, or desktop application). Furthermore, some embodiments of the briefing message assembler 270 specify the template for the headline and the body of the briefing. For example, the presentation component 220 presents one or more target briefing items in the body of the briefing message based on the template(s). Embodiments of the presentation component 220 present the target briefing messages to a user via any suitable application. Similarly, in one example, presentation component 220 specifies presentation content to present for each target briefing item based on the briefing item assembler 250. For example, in response to the briefing item assembler 250 assembling a briefing item, the presentation component 220 causes the briefing item and corresponding information to be presented in the body of the briefing message.

In one embodiment, presentation component 220 generates user interface elements associated with or used to facilitate the user engagement with certain target briefing items (such as shown in connection with FIGS. 3A, 3B, 3C, and 3D). Such elements can include icons or indicators, graphics buttons, sliders, menus, audio prompts, alerts, alarms, vibrations, pop-up windows, notification-bar or status-bar items, in-app notifications, queries, prompts, or other similar features for interfacing with a user.

Figure 3B:
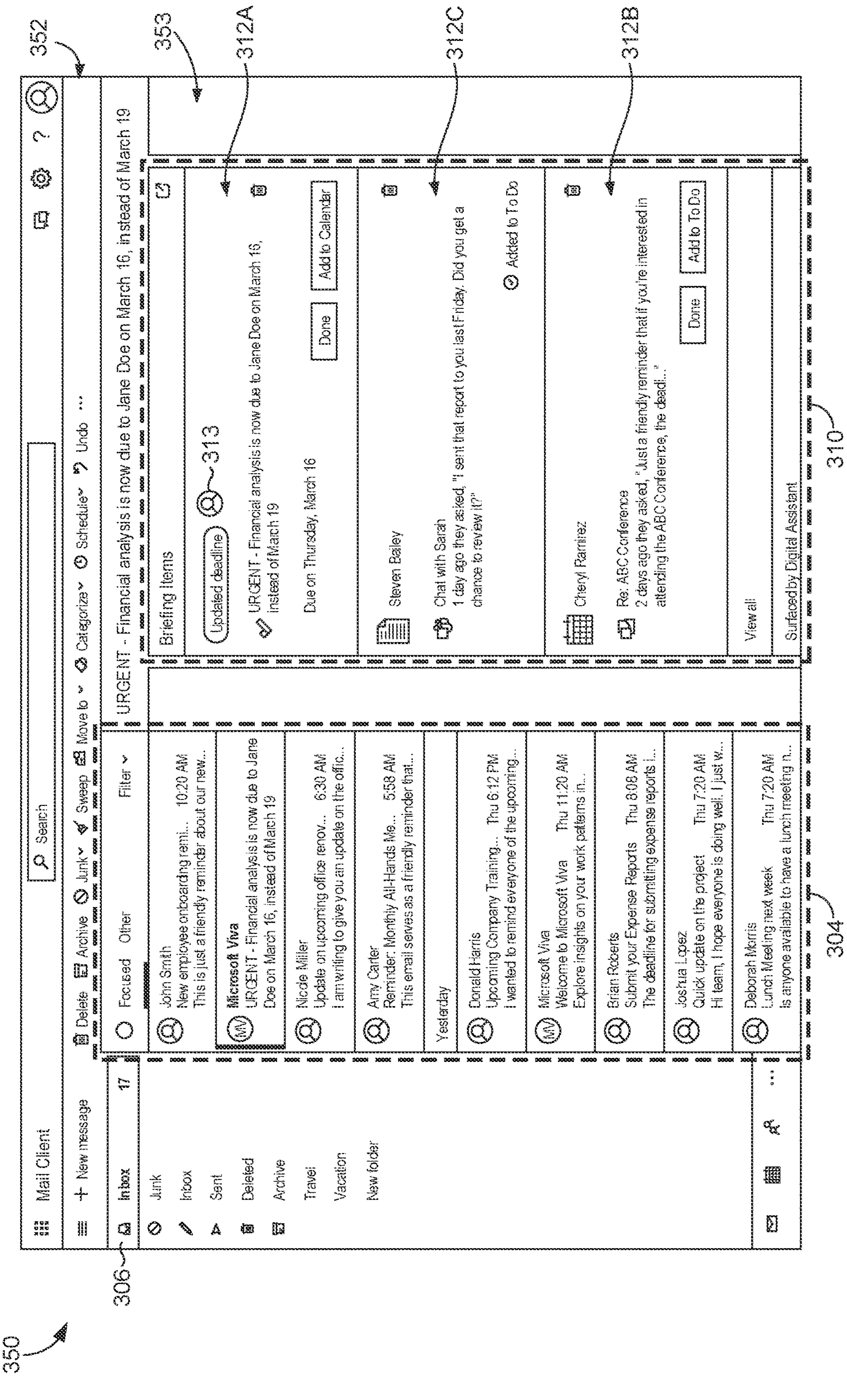
FIG. 3B illustratively depicts an example schematic screenshot from a personal computing device showing aspects of an example graphical user interface that presents a briefing message, in accordance with an embodiment of the present disclosure.
Figure 3C:
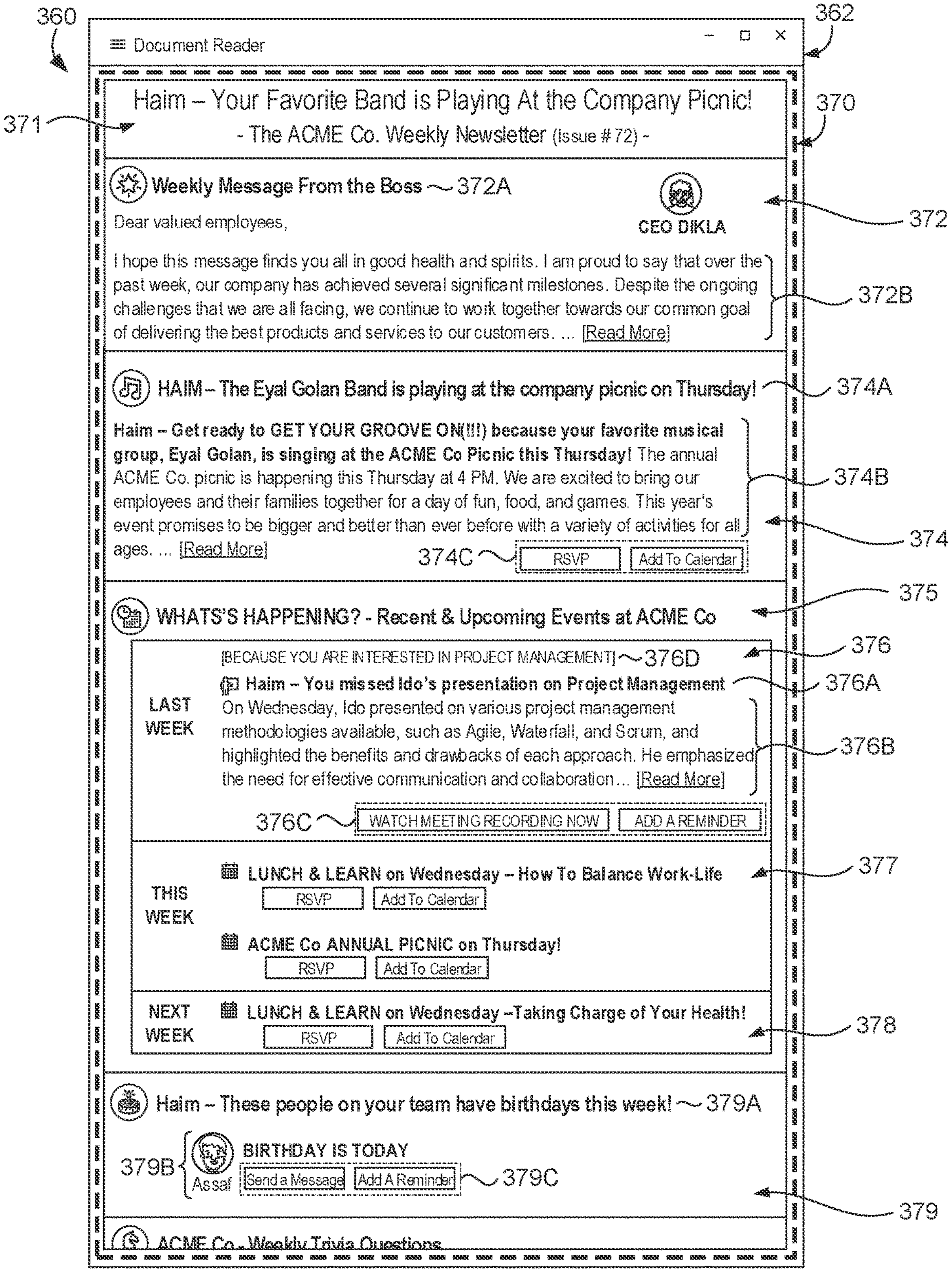
FIG. 3C illustratively depicts an example schematic screenshot from a personal computing device showing aspects of an example graphical user interface that presents a briefing message, in accordance with an embodiment of the present disclosure.
Figure 3D:
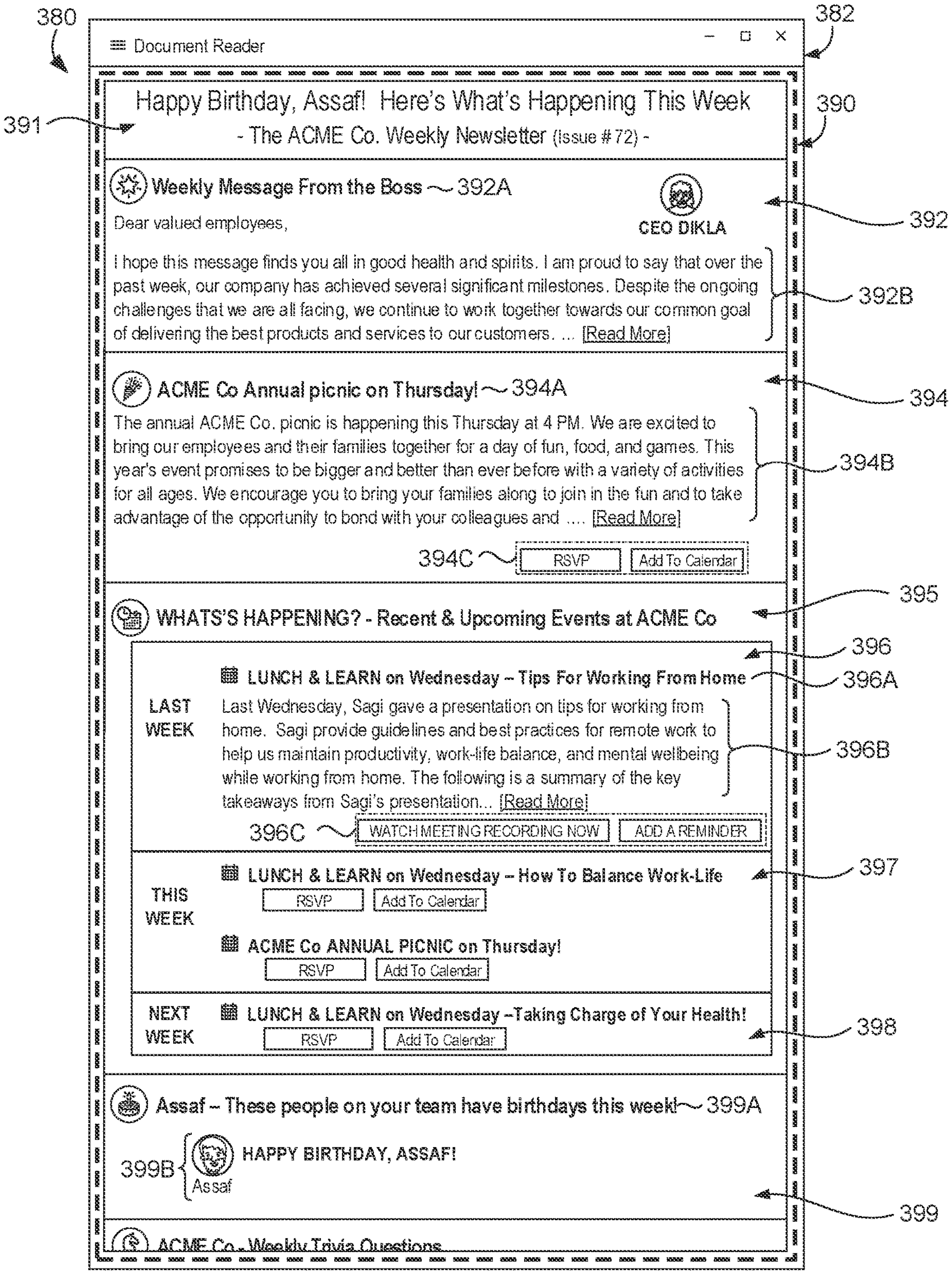
FIG. 3D illustratively depicts an example schematic screenshot from a personal computing device showing aspects of an example graphical user interface that presents a briefing message, such as a weekly newsletter, in accordance with an embodiment of the present disclosure.

With reference now to FIGS. 3A, 3B, 3C, and 3D, a number of example schematic screenshots from a personal computing device are illustratively depicted, showing aspects of example graphical user interfaces (GUIs) that include presentation of a briefing message that includes target briefing items, as described herein. The example briefing items shown in FIGS. 3A, 3B, 3C, and 3D are determined for a particular user and contextualized for that user, such as described in connection with the components of system 200 of FIG. 2. As such, in another example, another user is provided different briefing items, organized in different templates for the body of the briefing message, and with different headlines, or any combination thereof. The example target briefing items are assembled by the briefing item assembler 250 of FIG. 2, evaluated for inclusion based on the briefing item inclusion evaluator 260 of FIG. 2, and generated by the briefing message assembler 270 of FIG. 2 based on the user-specific features determined by briefing content handler 210 of FIG. 2. Moreover, the briefing items of FIG. 3A are grouped into classifications that are ordered based on the overall score of the classification, and the briefing items of FIG. 3B are organized based on the urgency scores of each target briefing item. Additionally, FIGS. 3C and 3D illustrate a briefing message in the form of a company newsletter that is contextualized and personalized for different users, such as employees of the company. However, it should be understood that the briefing items, the headline, and the body of the briefing message can be customized or differently generated based on the embodiments disclosed herein.

Turning to FIG. 3A, an example schematic screen display 300 is shown, which represents a computing device, such as user device 102*n*, discussed above with respect to FIG. 1. Screen display 300 is shown having a graphical user interface (GUI) 302, which could be produced on computing device screen display 300 by any number of different computer programs, applications or other displays discussed herein. As illustrated, the GUI 302 includes a briefing message 303, such as a briefing email. In some embodiments, the GUI 302 corresponds to a web-based email service. The illustrated GUI 302 includes a message catalog 304 listing messages, such as email messages, for a corresponding folder (in this example, the inbox folder 306). The illustrated GUI 302 includes a detailed message region 310 that displays the selected email message selected from the message catalog 304.

As discussed herein, certain briefing messages are generated with a headline that has been formatted by the briefing message assembler 270 and a message body that has been formatted by the briefing message assembler 270, as shown in FIG. 2. In this example, the headline and the body of the briefing message 303 have been formatted based on a weighted average of a plurality of scores, such as those discussed herein. In this example, the top scored briefing item is indicated in the headline of the briefing message 303 with an indication of the level of urgency to motivate a user to open the briefing message 303 and engage with the urgent briefing item. When the briefing message 303 is selected, the target briefing items are displayed in the detailed message region 310.

As illustrated, the detailed message region 310 includes two classifications of target briefing items 312. In this example, the two classifications are based on the source of the target briefing items 312, which in this example are "from your task list" and "from your messages." In one embodiment, "from your task list" indicates that the target briefing items within this classification section correspond to matters from the task list of the user. In one embodiment, the classification "from your task list" indicates that the corresponding target briefing item (that is, the first target briefing item 312A) includes user-content data sourced from the user's task list. In one embodiment, an organizational administrator has access to the task list to cause certain task lists to be updated. As illustrated, the classification "form your task list" includes a first target briefing item 312A indicative of the updated deadline, which in this example is Mar. 16, 2023. In this example, this deadline has been updated based on a change Jane Doe's calendar indicating that she will be out of the office during the original deadline of Mar. 19, 2023. To communicate additional information, the first target briefing item 312A includes a relevant image 313, for example, the image of Jane Doe. In one example, the briefing item includes a brief summary of the briefing item. The summary, in one example, is generated based on metadata contained in the briefing item. In this manner, the certain briefing messages include both an image and text to facilitate the user in consuming and quickly extrapolating information from the briefing message.

Continuing with FIG. 3A, the classification "from your messages" indicates that the corresponding target briefing item (that is, the second target briefing item 312B and the third target briefing item 312C) includes user-content data sourced from the user's messages. In some embodiments, the user's messages include the user's email, messaging applications (such as MICROSOFT TEAMS®), a social media application, and so forth.

Certain target briefing items 312 include selectable controls for performing a particular task. For example, certain target briefing items 312 include a selectable control for adding a particular target briefing item 312 to a calendar (for example, a MICROSOFT® Outlook calendar, GOOGLE® calendar, APPLE® calendar, and the like), a selectable control for marking a particular target briefing item 312 as done to remove it from the task list, a selectable control for adding the particular target briefing item 312 to a "to do list", and so forth. In the context of adding a particular target briefing item 312 to a "to do list", in the illustrated example, the third target briefing item 312C has been added to the "to do list" as indicated with the corresponding status 320.

Turning to FIG. 3B, an example schematic screen display 350 is shown, which represents a computing device, such as user device **102*n*, discussed above with respect to FIG. 1. Screen display 350 is shown having a graphical user interface (GUI) 352, which could be produced on the computing device screen display 350 by any of a number of different computer programs, applications or other displays discussed herein. As illustrated, the GUI 352 includes many of the same GUI elements as the GUI 302 of FIG. 3A. Whereas the target briefing items 312 in the briefing message of FIG. 3A are grouped based on their classification and then ordered within their classifications, in FIG. 3B, the target briefing items 312 of the briefing message 353 are ordered based on urgency irrespective of their classifications. Accordingly, in FIG. 3B, the target briefing items 312** are ordered based on their respective urgency.

Turning to FIG. 3C, depicted is a screenshot 360 of a GUI 362 showing an example document reader application that is presenting a briefing message 370 that is a weekly newsletter from the ACME Company for a particular recipient named Haim. In example screenshot 360, the example briefing message 370 is generated for the particular recipient, Haim, according to the embodiments of the technologies described herein.

Example briefing message 370 includes a title/heading 371 that is personalized for recipient Haim. Additionally, the briefing message 370 includes a few example briefing items including briefing items 372, 374, 375, 376, 377, 378, and 379. First example briefing item 372 includes a weekly message from the ACME Co CEO. The first example briefing item 372 includes a heading 372A and a briefing item description 372B. In this example, the briefing item heading 372A and briefing item description 372B are the same for all recipients of the briefing message 370.

Continuing with FIG. 3C, second example briefing item 374 includes information about an annual company picnic that is happening on Thursday. The second example briefing item 374 includes a heading 374A and a description 374B. In this example, the heading 374A and a description 374B are generated to be personalized to the recipient, Haim. In particular, heading 374A includes information that Haim's favorite band, "Eyal Golan," that is playing at the company picnic. In this example, the description 374B is also personalized to Haim, telling him to "get ready to get your groove on."

The second example briefing item 374 also includes suggested next actions 374C for the recipient to take regarding the briefing item 374. In this example, the suggested next actions 374C include options to RSVP and to add the picnic to Haim's calendar. In one example, these option are actionable and integratable to a productivity application. As further described herein, based on the briefing item type, certain briefing items may include actions that can be taken by the recipient of the briefing communication.

Continuing with FIG. 3C, third example briefing item 375 comprises information about events associated with ACME Company. In this example, briefing item 375 comprises three sub-components of events, which are instances of briefing items, including: briefing item 376 comprising events from last week, briefing item 377 comprising events for this week, and briefing item 378 comprising events for next week.

Continuing with FIG. 3C, fourth example briefing item 376 includes information about a presentation by Ido on Project Management. In particular, a heading 376A that is personalized to recipient is generated and provided. A description 376B of the presentation is also provided. In this example, the description 376B comprises a meeting summary and is generated by a briefing item assembler 250. In this example, suggested next actions 376C is also provided, which includes a selectable actions enabling the recipient to "watch the meeting recording now" to view Ido's presentation, or "add a reminder" to remind the recipient at a later time to view the meeting recording of Ido's presentation.

Additionally, in some embodiments, including this particular example of briefing item 376, an item insight 376D is provided that explains to the recipient why the particular item regarding the presentation on project management is being provided to the recipient. In this example, insight 376D indicates that it is being provided because the recipient is "interested in project management." As described in connection to FIG. 2, information related to a user may be utilized to determine relevance of candidate information items for being provided to the user.

Continuing with FIG. 3C, fifth example briefing item 379 includes information about birthdays of users on the recipient's team. For example briefing item 379 is personalized to the recipient and includes a heading 379A that is generated to be personalized to the recipient, and briefing item description 379B. In this example, description 379B indicates that team member Assaf has a birthday today. Embodiments of briefing item 379 also includes suggested next actions 379C. In this example, suggested next actions 379C include sending a message to Assaf, for example, to wish him a happy birthday, or adding a reminder regarding Assaf's birthday.

Turning to FIG. 3D, depicted is a screenshot 380 of a GUI 382 showing the example document reader application that is presenting a briefing message 390 that is a weekly newsletter from the ACME Company for the same week but for a different recipient named Assaf. In one example, each briefing communication 370 (FIG. 3C) and 390 of screenshots 360 and 380 are personalized for the particular recipient and presented via a document reader application, as shown in GUIs 362 (FIG. 3C) and 382.

Example briefing message 390 includes title/heading 391 that is personalized for recipient Assaf. Additionally, the briefing message 390 includes various example briefing items, including briefing items 392, 394, 395, 396, 397, 398, and 399. In this example, first example briefing 392 is the same as briefing item 372 (FIG. 3C) in the example briefing communication 370 (FIG. 3C). In particular, the first example briefing item 392 comprises the weekly message from the CEO of ACME Co, and includes a heading 392A and a briefing item description 392B. In this example, the briefing item heading 392A and briefing item description 392B are the same as heading 372A (FIG. 3C) and briefing item description 372B (FIG. 3C) of briefing item 372 (FIG. 3C) depicted in FIG. 3C. In other words, in screenshots 360 (FIG. 3C) and 380, briefing item 372 (FIG. 3C) and 392 are the same and are, thus, not generated to be personalized to the recipient.

Continuing with FIG. 3D, second example briefing item 394 includes information about the annual company picnic that is happening on Thursday. The second example briefing item 394 includes a heading 394A and a description 394B. In this example, the briefing item 394 also includes suggested next actions 394C for the recipient to take regarding the briefing item 394.

Continuing with FIG. 3D, third example briefing item 395 comprises information about events associated with ACME Company. In this example, briefing item 395 comprises three sub components of events, which are all instances of briefing items, including: briefing item 396 comprising events from last week, briefing item 397 comprising events for this week, and briefing item 398 comprising events for next week.

Continuing with FIG. 3D, fourth example briefing item 396 includes information about lunch and learn event covering the topic of "tips from working from home." In this example, the fourth example briefing item 396 includes a heading 396A and a description 396B. In this example, the fourth example briefing item 396 also includes suggested next actions 396C. It should be noted that, although example briefing messages 370 (FIG. 3C) and 390 correspond to the same weekly newsletter, the weekly newsletter is customized to the particular recipient, such that the particular briefing item 396 and briefing item 376 (FIG. 3C) are different. Accordingly, in some embodiments, a briefing item is determined for inclusion in a briefing communication based on relevance to the recipient, such as described in connection with briefing item inclusion evaluator 260 of FIG. 2. In this example, it is determined that the briefing item 376 (FIG. 3C) (covering project management) was less relevant to the recipient of briefing message 390, than briefing item 396 (covering tips for working from home). Accordingly, example briefing message 390 includes briefing item 396 but excludes briefing item 376 (FIG. 3C). In contrast, briefing items 397 and 398 are the same as briefing items 377 and 387 of example briefing message 370 of FIG. 3C.

Continuing with FIG. 3D, fifth example briefing item 399 includes information about birthdays of users on the recipient's team. In this example, fifth example briefing item 399 indicates that it is the recipient's birthday, thus fifth example briefing item 399 is personalized to the recipient. The fifth example briefing item 399 includes a heading 399A and briefing item description 399B that is generated to be personalized to the recipient.

Figure 4:
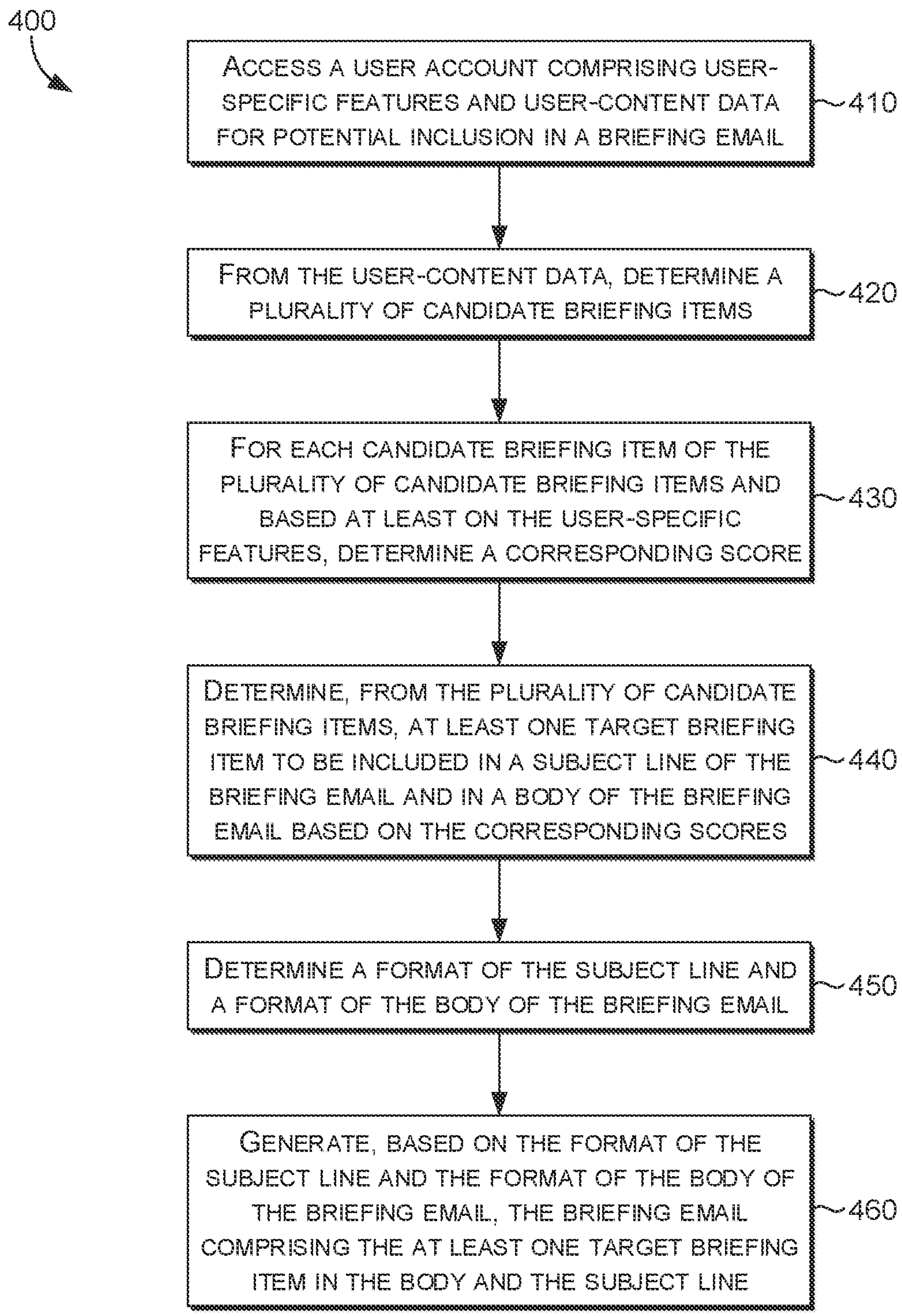
FIG. 4 depicts a flow diagram of a method for programmatically generating a briefing message based on a format of the headline and a format of the body of the briefing message, in accordance with an embodiment of the present disclosure.
Figure 5:
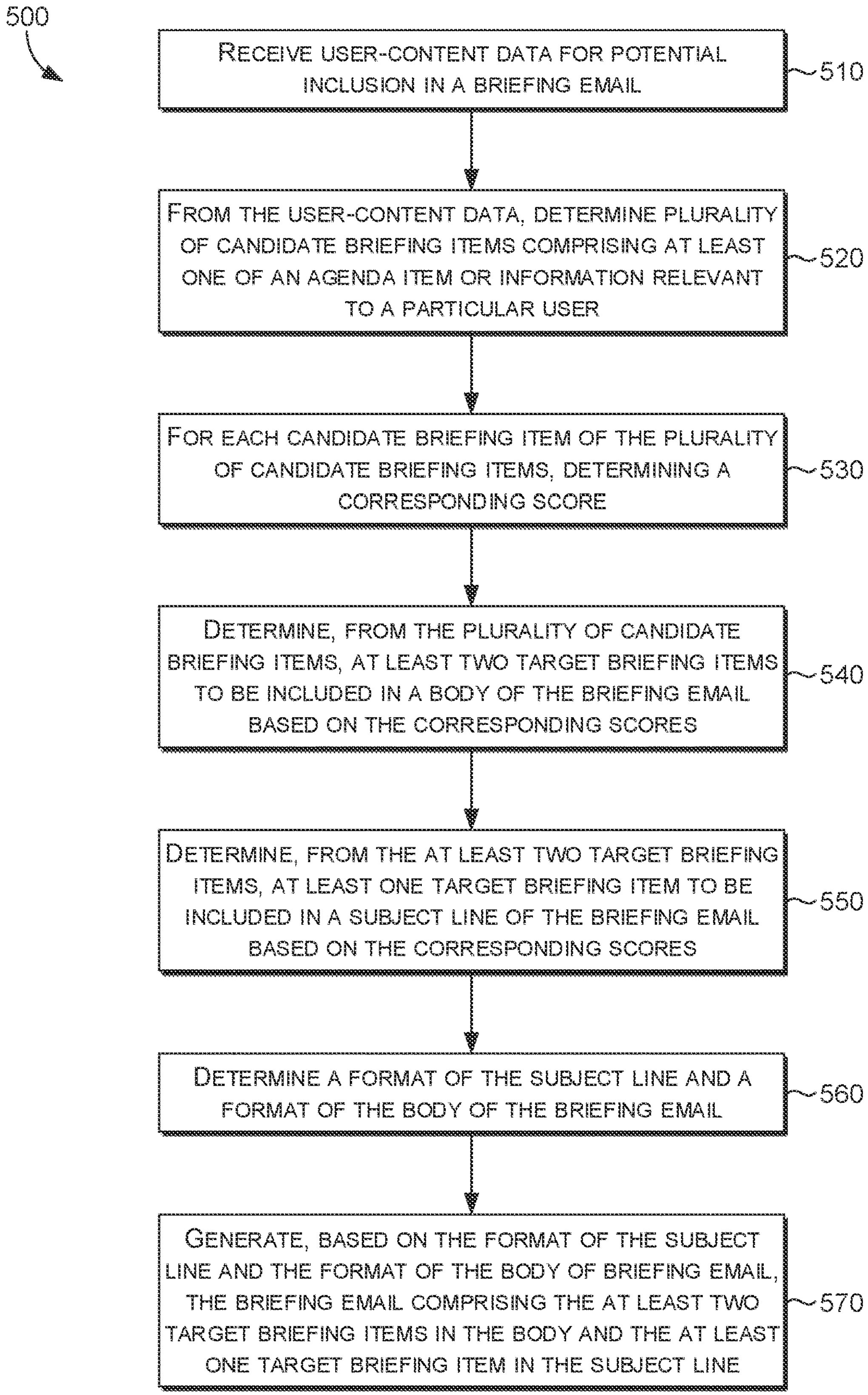
FIG. 5 depicts a flow diagram of a method for programmatically generating a briefing message that includes at least two target briefing items in the body of the briefing message and at least one target briefing item in the headline, in accordance with an embodiment of the present disclosure.
Figure 6:
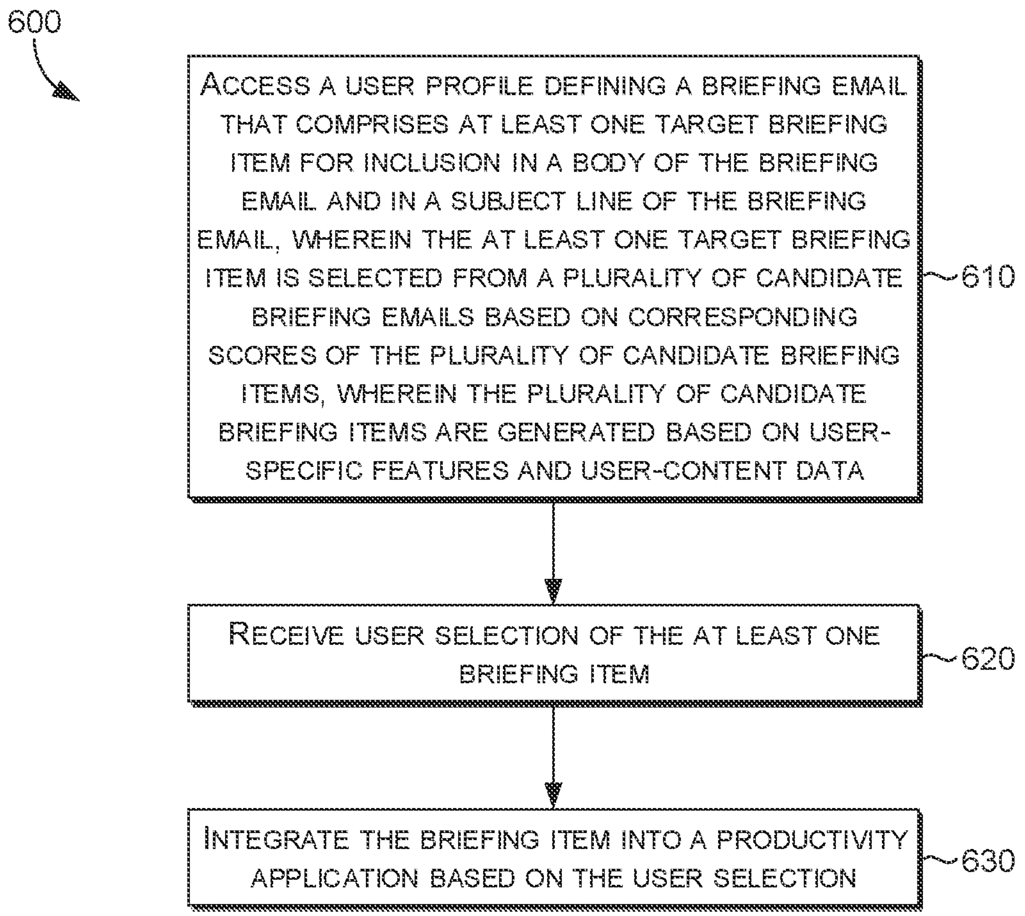
FIG. 6 depicts a flow diagram of a method for programmatically providing a meeting recording with a time-stretched segment playable at an adaptive playback speed, in accordance with an embodiment of the present disclosure.

Turning now to FIGS. 4, 5, and 6, aspects of example process flows 400, 500, and 600 are illustratively depicted for some embodiments of the disclosure. Embodiments of process flows 400, 500, and 600 each comprise a method (sometimes referred to herein as method 400, 500, and 600) carried out to implement various example embodiments described herein. For instance, at least one of process flow 400, 500, or 600 are performed to programmatically determine events of interest or generate enriched meeting playback timeline(s) for a user by processing user-content data, which are used to provide any of the improved electronic communications technology or enhanced user computing experiences described herein.

Each block or step of process flow 400, process flow 500, process flow 600, and other methods described herein comprises a computing process performed using any combination of hardware, firmware, and/or software. For instance, various functions are carried out by a processor executing instructions stored in memory, such as memory 712 as described in FIG. 7 and/or as storage 225 as described in FIG. 2. Embodiments of the methods are also be embodied as computer-usable instructions stored on computer storage media. Embodiments of the methods are provided by a stand-alone application, a service or hosted service (stand-alone or in combination with another hosted service), or a plug-in to another product, to name a few. For example, the blocks of process flow 400, 500, and 600 that correspond to actions (or steps) to be performed (as opposed to information to be processed or acted on) are carried out by one or more computer applications or services, in some embodiments, which operate on one or more user devices (such as user device 102*a* of FIG. 1), servers (such as server 106 of FIG. 1), and/or are distributed across multiple user devices, and/or servers, or by a distributed computing platform, and/or are implemented in the cloud, such as described in connection with FIG. 8. In some embodiments, the functions performed by the blocks or steps of process flows 400, 500, and 600 are carried out by components of system 200, as described in FIG. 2.

With reference to FIG. 4, aspects of example process flow 400 are illustratively provided for generating a briefing message that includes a target briefing item in the body and the headline. Example briefing messages are illustrated in FIGS. 3A,3B, 3C, and 3D.

At a block 410, method 400 includes accessing (1) a user account comprising user-specific features and (2) user-content data for potential inclusion in a briefing message. In one embodiment, the briefing content handler 210 (FIG. 2) accesses the user account and user-content data. Embodiments of the user account and user-content data are stored in storage 225 (FIG. 2) as part of the user profile 240 (FIG. 2).

At block 420, method 400 includes determining a plurality of candidate briefing items from the user-content data. In one embodiment, the candidate briefing items are determined by briefing item assembler 250 (FIG. 2).

At block 430, method 400 includes determining a corresponding score for each candidate briefing item of the plurality of candidate briefing items and based at least on the user-specific features. In one embodiment, the corresponding score is determined by the briefing item inclusion evaluator 260 (FIG. 2). Embodiments of determining the score include calculating a first score indicative of an importance to the user, a second score indicative of an urgency, a third score indicative of a freshness, a fourth score indicative of a uniqueness, a fifth score indicative of a user engagement with related candidate items, and a fifth score indicative of organizational input.

At block 440, method 400 includes determining, from the plurality of candidate briefing items, at least one target briefing item to be included in a headline of the briefing message and in a body of the briefing message based on the corresponding scores. In one embodiment, the corresponding score is determined by the briefing item inclusion evaluator 260.

At block 450, method 400 includes determining a format of the headline and a format of the body of the briefing message. In one embodiment, the corresponding score is determined by the briefing item inclusion evaluator 260. Embodiments of determining the format of the headline includes accessing a plurality of candidate headline templates; determining, based at least on the user-specific features, template metadata of each candidate headline template of the plurality of headline templates; determining target metadata from the at least one target briefing item; comparing the target metadata to the template metadata of each candidate headline template of the plurality of headline templates; and determining a relatedness between the template metadata and the target metadata based on the comparison, the format of the headline being based on the headline template having the highest or lowest relatedness.

At block 460, method 400 includes generating, based on the format of the headline and the format of the body of the briefing message, the briefing message. The generated briefing message comprises the at least one target briefing item indicated in the headline and included in the body. In one embodiment, the briefing message is generated by briefing message assembler 270 (FIG. 2). In one embodiment, generating the briefing message includes: determining an image based on visual features associated with the at least one target briefing item; and determining a summary based on text features indicative of a description for the at least one target briefing item, and wherein the briefing message is generated to include the image and the summary based on the format of the body of the briefing message.

With reference to FIG. 5, aspects of example process flow 500 are illustratively provided for generating, based on the format of the headline and the format of the body of briefing message, a briefing message such as that illustrated in FIGS. 3A,3B, 3C, and 3D. In one example, example process flow 500 is performed to generate the GUIs 302, 352, 362 and 382 illustrated in FIGS. 3A, 3B, 3C, and 3D respectively, and as described in connection with FIG. 2. Accordingly, at a block 510, method 500 includes receiving user-content data for potential inclusion in a briefing message. At a block 520, method 500 includes determining, from the user-content data, a plurality of candidate briefing items comprising at least one of an agenda item or information relevant to a particular user. At a block 530, method 500 includes determining a corresponding score for each candidate briefing item of the plurality of candidate briefing items. At a block 540, method 500 includes determining, from the plurality of candidate briefing items, at least two target briefing items to be included in a body of the briefing message based on the corresponding scores. At a block 550, method 500 includes determining, from the at least two target briefing items, at least one target briefing item to be indicated in a headline of the briefing message based on the corresponding scores. At a block 560, method 500 includes determining a format of the headline and a format of the body of the briefing message. At a block 570, method 500 includes generating, based on the format of the headline and the format of the body of briefing message, the briefing message. The generated briefing message comprises the at least two target briefing items in the body and indicates the at least one target briefing item in the headline.

With reference to FIG. 6, aspects of example process flow 600 are illustratively provided for integrating the at least one target briefing item into a productivity application. At a block 610, method 600 includes accessing a user profile defining a briefing message that comprises at least one target briefing item for inclusion in a body of the briefing message and indicated in a headline of the briefing message. In one embodiment, the at least one target briefing item is selected from a plurality of candidate briefing messages based on corresponding scores of the plurality of candidate briefing items. In one embodiment, the plurality of candidate briefing items are generated based on user-specific features and user-content data. At block 620, method 600 includes receiving user selection of the at least one target briefing item. At block 630, method 600 includes integrating the at least one target briefing item into a productivity application based on the user selection.

Accordingly, we have described various aspects of technology directed to systems and methods for intelligently processing and presenting, on a computing device, a briefing message that includes data that is formatted and contextualized for a user. It is understood that various features, sub-combinations, and modifications of the embodiments described herein are of utility and are employed in other embodiments without reference to other features or sub-combinations. Moreover, the order and sequences of steps shown in the example methods 400, 500, and 600 are not meant to limit the scope of the present disclosure in any way, and in fact, the steps can occur in a variety of different sequences within embodiments hereof. Such variations and combinations thereof are also contemplated to be within the scope of embodiments of this disclosure.

Other Embodiments

In some embodiments, a computing system is provided, employing any components of the computerized (or computer, computing, or cloud) system described in any of the embodiments above. The computing comprises at least one computer processor, and computer memory having computer-readable instructions embodied thereon, that, when executed by the at least one computer processor, perform operations. The operations comprise accessing (1) a user account comprising user-specific features and (2) user-content data for potential inclusion in a briefing message; determining a plurality of candidate briefing items from the user-content data; determining, based at least on the user-specific features, a corresponding score for each candidate briefing item of the plurality of candidate briefing items; determining, from the plurality of candidate briefing items, at least one target briefing item to be indicated in a headline of the briefing message and included in a body of the briefing message based on the corresponding scores; determining a format of the headline and a format of the body of the briefing message; and generating, based on the format of the headline and the format of the body of the briefing message, the briefing message comprising the at least one target briefing item in the body and the headline.

In any combination of the above embodiments of the computing system, accessing the user-content data comprises receiving content that is previously not included in a briefing message, from which the plurality of candidate briefing items are determined, wherein the at least one target briefing item comprises at least one candidate briefing item, of the plurality of candidate briefing items, selected based on the corresponding scores.

In any combination of the above embodiments of the computing system, the operations comprise ranking the plurality of candidate briefing items, wherein a non-null subset of candidate briefing items of the plurality of briefing items that satisfy a threshold number of briefing items is included as the at least one target briefing item.

In any combination of the above embodiments of the computing system, such that determining the format of the headline comprises: accessing a plurality of candidate headline templates; determining, based at least on the user-specific features, template metadata of each candidate headline template of the plurality of headline templates; determining target metadata from the at least one target briefing item; comparing the target metadata to the template metadata of each candidate headline template of the plurality of headline templates; and determining a relatedness between the template metadata and the target metadata based on the comparison, the format of the headline being based on the headline template having the highest or lowest relatedness.

In any combination of the above embodiments of the computing system, the briefing message comprises an email, newsletter, information feed, meeting summary, or event summary, and wherein the format of the headline is selected from a plurality of candidate headlines templates that are predetermined.

In any combination of the above embodiments of the computing system, determining the format of the body of the briefing message comprises: accessing a plurality of candidate body templates; determining, based at least on the user-specific features, template metadata of each candidate body template of the plurality of candidate body templates; determining target metadata from the at least one target briefing item; comparing the target metadata to the template metadata of each candidate body template of the plurality of candidate body templates; and determining a relatedness between the template metadata and the target metadata based on the comparison, the format of the briefing message body being based on the body template having a highest or lowest relatedness.

In any combination of the above embodiments of the computing system, generating the briefing message comprises: determining an image based on visual features associated with the at least one target briefing item; determining a summary based on text features indicative of a description for the at least one target briefing item; and determining a heading for the at least one briefing item; and wherein the briefing message is generated to include the image, the summary, and the heading based on the format of the body of the briefing message.

In any combination of the above embodiments of the computing system, a candidate briefing item of the plurality of candidate briefing items comprises at least one of: a scheduled task directly integratable with a productivity application, an agenda item, an information article, a suggestion for improving productivity, an analysis of a team associated with the particular user.

In any combination of the above embodiments of the computing system, the at least one target briefing item is further based on a level of user engagement with a previous target briefing item.

In some embodiments, a computer-implemented method is provided. The computer implemented method comprises: receiving user-content data for potential inclusion in a briefing message; from the user-content data, determining a plurality of candidate briefing items comprising at least one of an agenda item or information relevant to a particular user; for each candidate briefing item of the plurality of candidate briefing items, determining a corresponding score; determining, from the plurality of candidate briefing items, at least two target briefing items to be included in a body of the briefing message based on the corresponding scores of the plurality of candidate briefing items; determining, from the at least two target briefing items, at least one target briefing item to be indicated in a headline of the briefing message based on the corresponding scores of the plurality of candidate briefing items; determining a format of the headline and a format of the body of the briefing message; and generating, based on the format of the headline and the format of the body of the briefing message, the briefing message comprising the at least two target briefing items in the body and the at least one target briefing item indicated in the headline.

In any combination of the above embodiments of the computing-implemented method, determining the score comprises calculating a first score indicative of an importance to the user, a second score indicative of an urgency, a third score indicative of a freshness, a fourth score indicative of a uniqueness, a fifth score indicative of a user engagement with related candidate items, and a fifth score indicative of organizational input.

In any combination of the above embodiments of the computing-implemented method, the corresponding scores are calculated as a weighted average of the first score, the second score, the third score, the fourth score, and the fifth score, wherein the candidate briefing item is determined to be one of the at least two target briefing items based on the corresponding score being above a score threshold.

In any combination of the above embodiments of the computing-implemented method, generating the briefing message comprises: determining an image based on visual features associated with the at least one target briefing item; determining a summary based on text features indicative of a description for the at least one target briefing item; and determining a heading for the at least one briefing item; and wherein the briefing message is generated to include the image, the summary, and the heading based on the format of the body of the briefing message.

In any combination of the above embodiments of the computing-implemented method, the candidate briefing item comprises content from a plurality of data sources and is generated based on a degree of similarity between the content sourced from the plurality of sources.

In any combination of the above embodiments of the computing-implemented method, the body of the briefing message comprises a summary for each of the at least two target briefing items, wherein each summary is generated using a large language model having access to user-specific features.

In any combination of the above embodiments of the computing-implemented method, determining the format of the headline comprises: accessing a plurality of candidate headline templates; determining, based at least on user-specific features extracted from the user-content data, template metadata of each candidate headline template of the plurality of headline templates; determining target metadata from the at least one target briefing item; comparing the target metadata to the template metadata of each candidate headline template of the plurality of headline templates; and determining a relatedness between the template metadata and the target metadata based on the comparison, the format of the headline being based on the headline template having the highest or lowest relatedness.

In any combination of the above embodiments of the computing-implemented method, determining the format of the body of the briefing message comprises: accessing a plurality of candidate body templates; determining, based at least on user-specific features extracted from the user-content data, template metadata of each candidate body template of the plurality of candidate body templates; determining target metadata from the at least one target briefing item; comparing the target metadata to the template metadata of each candidate body template of the plurality of candidate body templates; and determining a relatedness between the template metadata and the target metadata based on the comparison, the format of the body being based on the body template having a highest or lowest relatedness.

In some embodiments, computer storage media has computer-executable instructions embodied thereon, that, when executed by at least one computer processor, cause computing operations to be performed. The operations comprise accessing a user profile defining a briefing message that comprises at least one target briefing item (1) for inclusion in a body of the briefing message and (2) indicated in a headline of the briefing message, wherein the at least one target briefing item is selected from a plurality of candidate briefing items based on corresponding scores of the plurality of candidate briefing items, wherein the plurality of candidate briefing items are generated based on user-specific features and user-content data. The operations further include receiving user selection of the at least one target briefing item; and integrating the at least one target briefing item into a productivity application based on the user selection.

In any combination of the above embodiments of the computer storage media, the user selection is received into a web browser separate from the productivity application, wherein the at least one target briefing item is integrated into the productivity application comprising an electronic email service.

In any combination of the above embodiments of the computer storage media, the productivity application is initiated in response to the user selection being received.

Example Computing Environments

Figure 7:
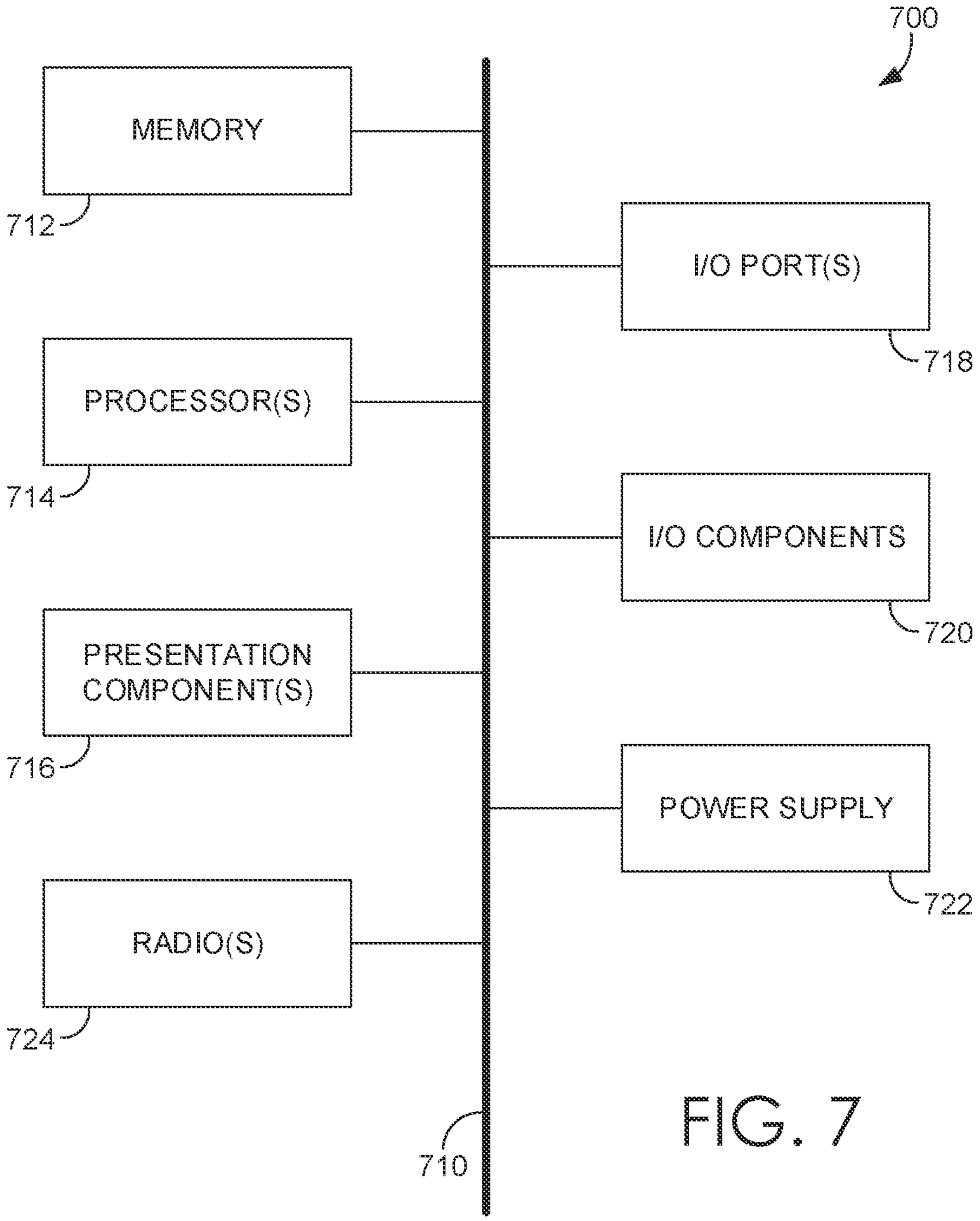
FIG. 7 is a block diagram of an example computing environment suitable for use in implementing an embodiment of the present disclosure.
Figure 8:
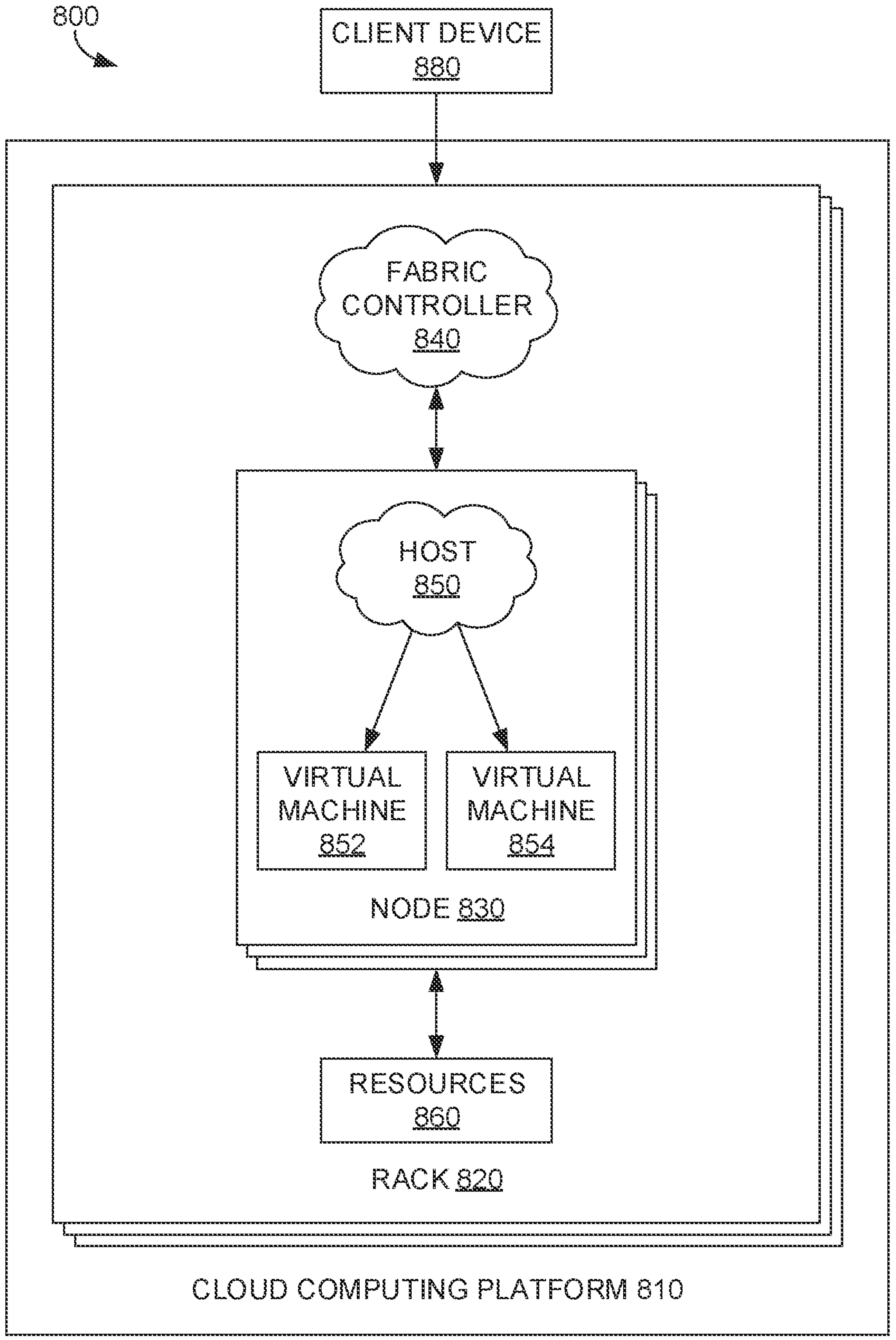
FIG. 8 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 7 and 8, respectively. With reference to FIG. 7, an example computing device is provided and referred to generally as computing device 700. The computing device 700 is but one example of a suitable computing environment and is not intended to suggest any limitation as to the scope of use or functionality of embodiments of the disclosure. Neither should the computing device 700 be interpreted as having any dependency or requirement relating to any one or combination of components illustrated.

Embodiments of the disclosure are described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also be practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system that operates within system components described herein to operate computer hardware to provide system functionality. At a low level, hardware processors generally execute instructions selected from a machine language (also referred to as machine code or native) instruction set for a given processor. The processor recognizes the native instructions and performs corresponding low level functions related to, for example, logic, control, and memory operations. Low level software written in machine code can provide more complex functionality to higher level software. Accordingly, in some embodiments, computer-executable instructions include any software, including low level software written in machine code, higher level software such as application software, and any combination thereof. In this regard, the system components can manage resources and provide services for system functionality. Any other variations and combinations thereof are contemplated with the embodiments of the present disclosure.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. In one example, bus 710 represents one or more buses (such as an address bus, data bus, or combination thereof). Although the various blocks of FIG. 7 are shown with lines for the sake of clarity, in reality, these blocks represent logical, not necessarily actual, components. For example, a presentation component includes a display device, such as an I/O component. Also, processors have memory. The inventors hereof recognize that such is the nature of the art and reiterate that the diagram of FIG. 7 is merely illustrative of an example computing device that can be used in connection with one or more embodiments of the present disclosure. Distinction is not made between such categories as “workstation,” “server,” “laptop,” or “handheld device,” as all are contemplated within the scope of FIG. 7 and with reference to “computing device.”

Computing device 700 typically includes a variety of computer-readable media. Computer-readable media can be any available media that can be accessed by computing device 700 and includes both volatile and nonvolatile, removable and non-removable media. By way of example, and not limitation, computer-readable media comprises computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term “modulated data signal” means a signal that has one or more of its characteristics set or changed in such a manner so as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. In one example, the memory is removable, non-removable, or a combination thereof. Hardware devices include, for example, solid-state memory, hard drives, and optical-disc drives. Computing device 700 includes one or more processors 714 that read data from various entities such as memory 712 or I/O components 720. As used herein and in one example, the term processor or "a processer" refers to more than one computer processor. For example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by processor are performed by more than one processor.

Presentation component(s) 716 presents data indications to a user or other device. Presentation components include, for example, a display device, speaker, printing component, vibrating component, and the like.

The I/O ports 718 allow computing device 700 to be logically coupled to other devices, including I/O components 720, some of which are built in. Illustrative components include a microphone, joystick, game pad, satellite dish, scanner, printer, or a wireless device. The I/O components 720 can provide a natural user interface (NUI) that processes air gestures, voice, or other physiological inputs generated by a user. In some instances, inputs are transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. In one example, the computing device 700 is equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some embodiments of computing device 700 include one or more radio(s) 724 (or similar wireless communication components). The radio transmits and receives radio or wireless communications. Example computing device 700 is a wireless terminal adapted to receive communications and media over various wireless networks. Computing device 700 may communicate via wireless protocols, such as code division multiple access ("CDMA"), Global System for Mobile ("GSM") communication, or time division multiple access ("TDMA"), as well as others, to communicate with other devices. In one embodiment, the radio communication is a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection includes, by way of example and not limitation, a Wi-Fi® connection to a device (for example, mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Referring now to FIG. 8, an example distributed computing environment 800 is illustratively provided, in which implementations of the present disclosure can be employed. In particular, FIG. 8 shows a high level architecture of an example cloud computing platform 810 that can host a technical solution environment, or a portion thereof (for example, a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (for example, machines, interfaces, functions, orders, and groupings of functions) can be used in addition to or instead of those shown.

Data centers can support distributed computing environment 800 that include cloud computing platform 810, rack 820, and node 830 (for example, computing devices, processing units, or blades) in rack 820. The technical solution environment can be implemented with cloud computing platform 810, which runs cloud services across different data centers and geographic regions. Cloud computing platform 810 can implement the fabric controller 840 component for provisioning and managing resource allocation, deployment, upgrade, and management of cloud services. Typically, cloud computing platform 810 acts to store data or run service applications in a distributed manner. Cloud computing platform 810 in a data center can be configured to host and support operation of endpoints of a particular service application. In one example, the cloud computing platform 810 is a public cloud, a private cloud, or a dedicated cloud.

Node 830 can be provisioned with host 850 (for example, operating system or runtime environment) running a defined software stack on node 830. Node 830 can also be configured to perform specialized functionality (for example, computer nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a multi-tenant infrastructure or tenancy. The terms "service application," "application," or "service" are used interchangeably with regards to FIG. 8, and broadly refer to any software, or portions of software, that run on top of, or access storage and computing device locations within, a datacenter.

When more than one separate service application is being supported by nodes 830, certain nodes 830 are partitioned into virtual machines (for example, virtual machine 852 and virtual machine 854). Physical machines can also concurrently run separate service applications. The virtual machines or physical machines can be configured as individualized computing environments that are supported by resources 860 (for example, hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In one embodiment, the servers perform data operations independently but exposed as a single device, referred to as a cluster. Each server in the cluster can be implemented as a node.

In some embodiments, client device 880 is linked to a service application in cloud computing platform 810. Client device 880 may be any type of computing device, such as user device 102*n* described with reference to FIG. 1, and the client device 880 can be configured to issue commands to cloud computing platform 810. In embodiments, client device 880 communicates with service applications through a virtual Internet Protocol (IP) and load balancer or other means that direct communication requests to designated endpoints in cloud computing platform 810. Certain components of cloud computing platform 810 communicate with each other over a network (not shown), which includes, without limitation, one or more local area networks (LANs) and/or wide area networks (WANs).

Additional Structural and Functional Features of Embodiments of Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (for example, machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., non-sequential) collection of objects (or elements), such as machines (for example, computer devices), physical and/or logical addresses, graph nodes, graph edges, functionalities, and the like. As used herein, a set may include N elements, where Nis any positive integer. That is, a set may include 1, 2, 3, . . . . N objects and/or elements, where N is a positive integer with no upper bound. Therefore, as used herein, a set does not include a null set (i.e., an empty set), that includes no elements (for example, N=0 for the null set). A set may include only a single element. In other embodiments, a set may include a number of elements that is significantly greater than one, two, three, or billions of elements. A set may be an infinite set or a finite set. The objects included in some sets may be discrete objects (for example, the set of natural numbers N). The objects included in other sets may be continuous objects (for example, the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the not null or empty set of objects. A set of objects that includes at least two of the objects may be referred to as "a plurality of objects."

As used herein and in one example, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "application" or "app" may be employed interchangeably to refer to any software-based program, package, or product that is executable via one or more (physical or virtual) computing machines or devices. An application may be any set of software products that, when executed, provide an end-user one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second application or a parallel execution of the first and second applications. In other embodiments, the execution of the first and second application may be interleaved.

For purposes of a detailed discussion above, embodiments of the present invention are described with reference to a computing device or a distributed computing environment;

however the computing device and distributed computing environment depicted herein are non-limiting examples. Moreover, the terms computer system and computing system may be used interchangeably herein, such that a computer system is not limited to a single computing device, nor does a computing system require a plurality of computing devices. Rather various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A computer system, comprising:

at least one processor; and computer memory having computer-readable instructions embodied thereon, that, when executed by the at least one processor, perform operations comprising:

accessing (1) a user account comprising user-specific features and (2) user-content data for potential inclusion in a briefing message;

from the user-content data, determining a plurality of candidate briefing items;

for each candidate briefing item of the plurality of candidate briefing items, determining a corresponding item type based on a classification of the candidate briefing item;

based at least on the user-specific features, determining at least one corresponding score for each candidate briefing item of the plurality of candidate briefing items, the at least one corresponding score determined based on freshness, relatedness to the user, uniqueness to the user, user engagement, or organizational input;

from the plurality of candidate briefing items, determining to include a plurality of diverse target briefing items in the briefing message by selecting candidate briefing items having different corresponding item types and having corresponding scores above a threshold score;

determining, from the plurality of diverse target briefing items, at least one target briefing item to be indicated in a headline of the briefing message based on the at least one corresponding score;

determining a format of the headline and a format of the body of the briefing message; and generating, based on the format of the headline and the format of the body of the briefing message, the briefing message comprising the at least one target briefing item indicated in the headline of the briefing message and the plurality of diverse target briefing items in the body of the briefing message.

2. The system of claim 1, wherein accessing the user-content data comprises receiving content that is previously not included in a briefing message, from which the plurality of candidate briefing items are determined, and wherein a freshness score corresponds to how recently user content data was made available for determining a corresponding candidate briefing item, a score for relatedness to the user is determined based on user activity, a score for uniqueness to the user is computed as a rarity score indicating how uncommon a corresponding candidate briefing item is, a score for user engagement corresponds to a determination that the user will engage in an activity related to the corresponding candidate briefing item, and a score for organizational input is determined using organizational data from an organization of which the user is a member.

3. The system of claim 1, wherein the operations comprise ranking the plurality of candidate briefing items, wherein a non-null subset of candidate briefing items of the plurality of briefing items that satisfy a threshold number of briefing items is included as the plurality of diverse target briefing items.

4. The system of claim 1, wherein determining the format of the headline comprises:

accessing a plurality of candidate headline templates;

determining, based at least on the user-specific features, template metadata of each candidate headline template of the plurality of headline templates;

determining target metadata from the at least one target briefing item;

comparing the target metadata to the template metadata of each candidate headline template of the plurality of headline templates; and determining a relatedness between the template metadata and the target metadata based on the comparison, the format of the headline being based on the headline template having the highest or lowest relatedness.

5. The system of claim 1, wherein the briefing message comprises an email, newsletter, information feed, meeting summary, or event summary, and wherein the format of the headline is selected from a plurality of candidate headlines templates that are predetermined.

6. The system of claim 1, wherein determining the format of the body of the briefing message comprises:

accessing a plurality of candidate body templates;

determining, based at least on the user-specific features, template metadata of each candidate body template of the plurality of candidate body templates;

determining target metadata from the at least one target briefing item; comparing the target metadata to the template metadata of each candidate body template of the plurality of candidate body templates; and determining a relatedness between the template metadata and the target metadata based on the comparison, the format of the briefing message body being based on the body template having a highest or lowest relatedness.

7. The system of claim 1, wherein generating the briefing message comprises:

determining an image based on visual features associated with the at least one target briefing item;

determining a summary based on text features indicative of a description for the at least one target briefing item; and determining a heading for the at least one briefing item; and wherein the briefing message is generated to include the image, the summary, and the heading based on the format of the body of the briefing message.

8. The system of claim 1, wherein a candidate briefing item of the plurality of candidate briefing items comprises at least one of: a scheduled task directly integratable with a productivity application, an agenda item, an information article, a suggestion for improving productivity, an analysis of a team associated with the particular user.

9. The system of claim 1, wherein the at least one target briefing item is further based on a level of user engagement with a previous target briefing item.

10. A computer-implemented method, comprising:

receiving user-content data for potential inclusion in a briefing message;

from the user-content data, determining a plurality of candidate briefing items comprising at least one of an agenda item or information relevant to a particular user;

for each candidate briefing item of the plurality of candidate briefing items, determining a corresponding item type based on a classification of the candidate briefing item;

for each candidate briefing item of the plurality of candidate briefing items, determining at least one corresponding score, the at least one corresponding score determined based on freshness, relatedness to the user, uniqueness to the user, user engagement, or organizational input;

from the plurality of candidate briefing items, determining to include a plurality of diverse target briefing items in the briefing message by selecting candidate briefing items having different corresponding item types and having corresponding scores above a threshold score;

determining, from the plurality of candidate briefing items, at least two diverse target briefing items to be included in a body of the briefing message based on the at least one corresponding score and the corresponding item type of the plurality of candidate briefing items;

determining, from the at least two diverse target briefing items, at least one target briefing item to be indicated in a headline of the briefing message based on the at least one corresponding score of the plurality of candidate briefing items;

determining a format of the headline and a format of the body of the briefing message; and generating, based on the format of the headline and the format of the body of the briefing message, the briefing message comprising the at least two diverse target briefing items in the body and the at least one target briefing item indicated in the headline.

11. The computer-implemented method of claim 10, wherein determining the at least one corresponding score comprises determining a plurality of corresponding scores by calculating a first score indicative of an importance to the user, a second score indicative of an urgency, a third score indicative of a freshness, a fourth score indicative of a uniqueness, a fifth score indicative of a user engagement with related candidate items, and a fifth score indicative of organizational input.

12. The computer-implemented method of claim 11, wherein the at least one corresponding score is calculated as a weighted average of the first score, the second score, the third score, the fourth score, and the fifth score, wherein the corresponding candidate briefing item is determined to be one of the at least two diverse target briefing items based on the at least one corresponding score being above a score threshold.

13. The computer-implemented method of claim 10, wherein generating the briefing message comprises:

determining an image based on visual features associated with the at least one target briefing item;

determining a summary based on text features indicative of a description for the at least one target briefing item; and determining a heading for the at least one briefing item; and wherein the briefing message is generated to include the image, the summary, and the heading based on the format of the body of the briefing message.

14. The computer-implemented method of claim 10, wherein the candidate briefing item comprises content from a plurality of data sources and is generated based on a degree of similarity between the content sourced from the plurality of sources.

15. The computer-implemented method of claim 10, wherein the body of the briefing message comprises a summary for each of the at least two diverse target briefing items, wherein each summary is generated using a large language model having access to user-specific features.

16. The computer-implemented method of claim 10, determining the format of the headline comprises:

accessing a plurality of candidate headline templates;

determining, based at least on user-specific features extracted from the user-content data, template metadata of each candidate headline template of the plurality of headline templates;

determining target metadata from the at least one target briefing item;

comparing the target metadata to the template metadata of each candidate headline template of the plurality of headline templates; and determining a relatedness between the template metadata and the target metadata based on the comparison, the format of the headline being based on the headline template having the highest or lowest relatedness.

17. The computer-implemented method of claim 10, wherein determining the format of the body of the briefing message comprises:

accessing a plurality of candidate body templates;

determining, based at least on user-specific features extracted from the user-content data, template metadata of each candidate body template of the plurality of candidate body templates;

determining target metadata from the at least one target briefing item;

comparing the target metadata to the template metadata of each candidate body template of the plurality of candidate body templates; and determining a relatedness between the template metadata and the target metadata based on the comparison, the format of the body being based on the body template having a highest or lowest relatedness.

18. Computer storage media having computer-executable instructions embodied thereon, that, when executed by at least one computer processor, cause computing operations to be performed, the operations comprising:

accessing a user profile defining a briefing message that comprises a plurality of diverse target briefing items for inclusion in a body of the briefing message, wherein each target briefing items is generated based on user-specific features and user-content data, and wherein each target briefing item is determined for inclusion in the body of the briefing message by selecting candidate briefing items having different corresponding item types and having corresponding scores above a threshold score;

receiving user selection of at least one target briefing item; and integrating the at least one target briefing item into a productivity application based on the user selection.

19. The computer storage media of claim 18, wherein the user selection is received into a web browser separate from the productivity application, wherein the at least one target briefing item is integrated into the productivity application comprising an electronic email service.

20. The computer storage media of claim 18, wherein the productivity application is initiated in response to the user selection being received.

* * * * *